United States Patent
Roever et al.

(10) Patent No.: US 11,599,657 B2
(45) Date of Patent: Mar. 7, 2023

(54) RIGHTS-BASED SYSTEM

(71) Applicant: API Market, Inc., San Mateo, CA (US)

(72) Inventors: Stefan Roever, Los Altos, CA (US); David Watson, Half Moon Bay, CA (US)

(73) Assignee: API Market, Inc., San Mateo, CA (US)

( * ) Notice: Subject to any disclaimer, the term of this patent is extended or adjusted under 35 U.S.C. 154(b) by 316 days.

(21) Appl. No.: 16/946,018

(22) Filed: Jun. 2, 2020

(65) Prior Publication Data

US 2021/0042434 A1 Feb. 11, 2021

Related U.S. Application Data

(63) Continuation of application No. 16/100,658, filed on Aug. 10, 2018, now Pat. No. 10,706,168, which is a (Continued)

(51) Int. Cl.
*G06F 21/62* (2013.01)
*G06F 21/10* (2013.01)
(Continued)

(52) U.S. Cl.
CPC .......... *G06F 21/6218* (2013.01); *G06F 21/10* (2013.01); *G06F 21/335* (2013.01);
(Continued)

(58) Field of Classification Search
CPC .... G06F 21/6218; G06F 21/10; G06F 21/335; G06F 2221/2137; H04L 63/08; H04L 63/12
See application file for complete search history.

(56) References Cited

U.S. PATENT DOCUMENTS

| 5,063,507 A | 11/1991 | Lindsey |
| 5,455,407 A | 10/1995 | Rosen |

(Continued)

FOREIGN PATENT DOCUMENTS

| JP | 02-245970 | 1/1990 |
| JP | 2001-338242 A | 12/2001 |

(Continued)

OTHER PUBLICATIONS

U.S. Office Action dated Oct. 3, 2008 issued in U.S. Appl. No. 11/094,784.

(Continued)

*Primary Examiner* — Aravind K Moorthy
(74) *Attorney, Agent, or Firm* — Weaver Austin Villeneuve & Sampson LLP

(57) ABSTRACT

A rights-based system is described in which vouchers are employed for creating, managing, distributing, and redeeming rights in digital contexts. A voucher is a digital, possession-based rights representation. An authorization component of the system validates the vouchers and issues corresponding tokens. Access to digital resources is provided in response to presentation of the tokens which are validated by matching voucher refresh values to corresponding values maintained by the system. New refresh values are generated and inserted in the vouchers each time they are redeemed.

20 Claims, 7 Drawing Sheets

Related U.S. Application Data continuation of application No. 15/298,103, filed on Oct. 19, 2016, now Pat. No. 10,073,984, which is a continuation of application No. 13/558,238, filed on Jul. 25, 2012, now Pat. No. 9,509,704.

(60) Provisional application No. 61/514,249, filed on Aug. 2, 2011.

(51) Int. Cl.
  *G06F 21/33* (2013.01)
  *H04L 9/40* (2022.01)

(52) U.S. Cl.
  CPC .............. *H04L 63/08* (2013.01); *H04L 63/12* (2013.01); *G06F 2221/2137* (2013.01)

(56) References Cited

U.S. PATENT DOCUMENTS

| | | | |
|---|---|---|---|
| 5,606,609 | A | 2/1997 | Houser et al. |
| 5,629,980 | A | 5/1997 | Stefik et al. |
| 5,752,020 | A | 5/1998 | Ando |
| 5,778,182 | A | 7/1998 | Cathey et al. |
| 5,794,217 | A | 8/1998 | Allen |
| 5,812,670 | A | 9/1998 | Micali |
| 5,828,751 | A | 10/1998 | Walker |
| 5,857,023 | A | 1/1999 | Demers et al. |
| 5,892,900 | A | 4/1999 | Ginter et al. |
| 5,903,880 | A | 5/1999 | Biffar |
| 5,905,976 | A | 5/1999 | Mjolsnes et al. |
| 5,941,947 | A | 8/1999 | Brown et al. |
| 5,956,736 | A | 9/1999 | Hanson |
| 6,065,117 | A | 5/2000 | White |
| 6,070,171 | A | 5/2000 | Snyder et al. |
| 6,078,909 | A | 6/2000 | Knutson |
| 6,098,056 | A | 8/2000 | Rusnak et al. |
| 6,119,229 | A | 9/2000 | Martinez et al. |
| 6,141,006 | A | 10/2000 | Knowlton |
| 6,154,214 | A | 11/2000 | Uyehara et al. |
| 6,170,744 | B1 | 1/2001 | Lee et al. |
| 6,189,097 | B1 | 2/2001 | Tycksen, Jr |
| 6,205,436 | B1 | 3/2001 | Rosen et al. |
| 6,212,504 | B1 | 4/2001 | Hayosh |
| 6,292,788 | B1 | 9/2001 | Roberts et al. |
| 6,327,578 | B1 | 12/2001 | Linehan |
| 6,330,544 | B1 | 12/2001 | Walker et al. |
| 6,341,353 | B1 | 1/2002 | Herman et al. |
| 6,360,254 | B1 | 3/2002 | Linden et al. |
| 6,372,974 | B1 | 4/2002 | Gross et al. |
| 6,374,402 | B1 * | 4/2002 | Schmeidler .......... H04L 12/2856 348/E7.071 |
| 6,378,075 | B1 | 4/2002 | Goldstein et al. |
| 6,389,541 | B1 | 5/2002 | Patterson |
| 6,519,573 | B1 | 2/2003 | Shade et al. |
| 6,574,609 | B1 | 6/2003 | Downs |
| 6,578,078 | B1 | 6/2003 | Smith et al. |
| 6,587,867 | B1 | 7/2003 | Miller et al. |
| 6,591,260 | B1 | 7/2003 | Schwarzhoff et al. |
| 6,600,823 | B1 | 7/2003 | Hayosh |
| 6,629,081 | B1 | 9/2003 | Cornelius et al. |
| 6,640,304 | B2 | 10/2003 | Ginter et al. |
| 6,662,340 | B2 | 12/2003 | Rawat et al. |
| 6,675,153 | B1 | 1/2004 | Cook et al. |
| 6,751,670 | B1 | 6/2004 | Patterson |
| 6,772,341 | B1 | 8/2004 | Shrader et al. |
| 6,820,204 | B1 | 11/2004 | Desai et al. |
| 6,842,741 | B1 | 1/2005 | Fujimura |
| 6,853,727 | B1 * | 2/2005 | Foster .................... H04N 5/913 380/239 |
| 6,868,392 | B1 | 3/2005 | Ogasawara |
| 6,871,220 | B1 | 3/2005 | Rajan et al. |
| 6,882,979 | B1 * | 4/2005 | Reay .................. G06Q 30/0613 705/26.82 |
| 6,895,392 | B2 | 5/2005 | Stefik et al. |
| 6,898,576 | B2 | 5/2005 | Stefik et al. |
| 6,910,179 | B1 | 6/2005 | Pennell et al. |
| 6,913,193 | B1 | 7/2005 | Kawan |
| 6,920,567 | B1 | 7/2005 | Doherty et al. |
| 6,925,439 | B1 | 8/2005 | Pitroda |
| 6,938,021 | B2 | 8/2005 | Shear et al. |
| 6,941,291 | B1 | 9/2005 | Zoller et al. |
| 6,944,776 | B1 | 9/2005 | Lockhart et al. |
| 6,947,556 | B1 | 9/2005 | Matyas et al. |
| 6,947,571 | B1 | 9/2005 | Rhoads et al. |
| 7,003,670 | B2 | 2/2006 | Heavan et al. |
| 7,010,512 | B1 | 3/2006 | Gillin |
| 7,016,877 | B1 | 3/2006 | Steele et al. |
| 7,020,626 | B1 | 3/2006 | Eng et al. |
| 7,028,009 | B2 | 4/2006 | Wang et al. |
| 7,035,271 | B1 * | 4/2006 | Peterson ................ H04L 9/40 709/217 |
| 7,069,234 | B1 | 6/2006 | Cornelius et al. |
| 7,069,310 | B1 | 6/2006 | Bartholomew |
| 7,099,849 | B1 | 8/2006 | Reeder et al. |
| 7,103,574 | B1 | 9/2006 | Peinado et al. |
| 7,120,606 | B1 | 10/2006 | Ranzini et al. |
| 7,130,829 | B2 | 10/2006 | Banerjee et al. |
| 7,191,332 | B1 | 3/2007 | Pankajakshan et al. |
| 7,203,844 | B1 * | 4/2007 | Oxford ............... H04L 63/0478 713/193 |
| 7,243,138 | B1 * | 7/2007 | Majkut ............... G06F 21/6218 709/219 |
| 7,249,107 | B2 | 7/2007 | Yaacovi |
| 7,275,260 | B2 | 9/2007 | de Jong et al. |
| 7,318,049 | B2 | 1/2008 | Iannacci |
| 7,346,923 | B2 | 3/2008 | Atkins |
| 7,392,226 | B1 | 6/2008 | Sasaki et al. |
| 7,401,221 | B2 | 7/2008 | Adent et al. |
| 7,424,747 | B2 | 9/2008 | DeTrevilie |
| 7,426,492 | B1 | 9/2008 | Bishop et al. |
| 7,444,519 | B2 | 10/2008 | Laferriere et al. |
| 7,450,969 | B1 * | 11/2008 | Cockayne ............... H04L 69/18 455/414.3 |
| 7,454,622 | B2 | 11/2008 | Laidlaw et al. |
| 7,580,877 | B1 | 8/2009 | Argenbright |
| 7,599,854 | B1 * | 10/2009 | Baum ..................... G07F 17/26 705/26.1 |
| 7,614,078 | B1 | 11/2009 | Stieglitz |
| 7,680,819 | B1 | 3/2010 | Mellmer et al. |
| 7,707,066 | B2 | 4/2010 | Roever |
| 7,707,121 | B1 | 4/2010 | Roever et al. |
| 7,774,499 | B1 | 8/2010 | Popek et al. |
| 7,814,025 | B2 | 10/2010 | Roever |
| 7,954,139 | B1 * | 5/2011 | Hall ..................... H04L 63/101 726/5 |
| 8,042,063 | B1 * | 10/2011 | Lin-Hendel ............ H04L 67/02 715/822 |
| 8,170,929 | B1 | 5/2012 | Mallon et al. |
| 8,171,085 | B1 * | 5/2012 | Tevanian, Jr. .......... H04L 63/12 713/176 |
| 8,302,169 | B1 * | 10/2012 | Presotto ................ G06F 21/602 726/19 |
| 8,549,581 | B1 * | 10/2013 | Kailash ............... G06F 21/6218 726/8 |
| 8,566,461 | B1 | 10/2013 | Jun et al. |
| 8,571,992 | B2 | 10/2013 | Roever et al. |
| 8,589,405 | B1 * | 11/2013 | Estan .................. G06F 16/2468 707/758 |
| 8,738,457 | B2 | 5/2014 | Roever et al. |
| 8,775,810 | B1 * | 7/2014 | Snodgrass ................ H04L 9/08 713/175 |
| 8,804,956 | B2 | 8/2014 | Hiriart |
| 8,806,601 | B2 * | 8/2014 | Sheehan ............... G06F 21/445 709/227 |
| 8,880,889 | B1 * | 11/2014 | Ward .................... H04L 9/3247 713/176 |
| 9,177,338 | B2 | 11/2015 | Collins et al. |
| 9,509,704 | B2 | 11/2016 | Roever et al. |
| 9,589,140 | B2 * | 3/2017 | Wallin ................... G06F 21/10 |
| 9,621,372 | B2 | 4/2017 | Roever et al. |
| 10,073,984 | B2 | 9/2018 | Roever et al. |
| 10,192,234 | B2 | 1/2019 | Collins et al. |

(56) References Cited

U.S. PATENT DOCUMENTS

| | | |
|---|---|---|
| 10,198,719 B2 | 2/2019 | Collins et al. |
| 10,380,621 B2 | 8/2019 | Thrasher et al. |
| 10,467,606 B2 | 11/2019 | Roever et al. |
| 10,706,168 B2 | 7/2020 | Roever et al. |
| 2001/0008557 A1 | 7/2001 | Stefik et al. |
| 2001/0026287 A1 | 10/2001 | Watanbe |
| 2001/0032312 A1 | 10/2001 | Runje et al. |
| 2002/0004847 A1 | 1/2002 | Tanno |
| 2002/0023219 A1* | 2/2002 | Treffers ............... G06Q 50/184 713/176 |
| 2002/0026445 A1 | 2/2002 | Chica et al. |
| 2002/0029183 A1 | 3/2002 | Vlahoplus et al. |
| 2002/0032646 A1 | 3/2002 | Sweeney et al. |
| 2002/0038278 A1 | 3/2002 | Himmelstein |
| 2002/0040346 A1 | 4/2002 | Kwan |
| 2002/0048369 A1 | 4/2002 | Ginter et al. |
| 2002/0062249 A1 | 5/2002 | Iannacci |
| 2002/0082961 A1 | 6/2002 | Abrahm et al. |
| 2002/0091643 A1 | 7/2002 | Okamoto |
| 2002/0091646 A1 | 7/2002 | Lake et al. |
| 2002/0099564 A1 | 7/2002 | Kim |
| 2002/0106081 A1 | 8/2002 | Yang |
| 2002/0116471 A1 | 8/2002 | Shteyn |
| 2002/0128940 A1 | 9/2002 | Orrin et al. |
| 2002/0129140 A1 | 9/2002 | Peled et al. |
| 2002/0131594 A1* | 9/2002 | Hori ....................... H04N 5/907 386/E5.067 |
| 2002/0136405 A1* | 9/2002 | Hori ................... G06Q 20/1235 380/203 |
| 2002/0143703 A1 | 10/2002 | Razvan et al. |
| 2002/0147929 A1 | 10/2002 | Rose |
| 2002/0152126 A1 | 10/2002 | Lieu et al. |
| 2002/0152173 A1 | 10/2002 | Rudd |
| 2002/0152262 A1 | 10/2002 | Arkin et al. |
| 2002/0156743 A1 | 10/2002 | DeTrevile |
| 2002/0164025 A1* | 11/2002 | Raiz ....................... G06F 21/10 380/231 |
| 2002/0178082 A1 | 11/2002 | Krause et al. |
| 2002/0184504 A1 | 12/2002 | Hughes |
| 2002/0198843 A1 | 12/2002 | Wang et al. |
| 2003/0004885 A1 | 1/2003 | Banerjee et al. |
| 2003/0023561 A1 | 1/2003 | Stefik et al. |
| 2003/0023564 A1 | 1/2003 | Padhye et al. |
| 2003/0028489 A1 | 2/2003 | Williamson |
| 2003/0046093 A1 | 3/2003 | Erickson et al. |
| 2003/0061170 A1* | 3/2003 | Uzo ....................... G06Q 20/29 705/37 |
| 2003/0061566 A1 | 3/2003 | Rubstein et al. |
| 2003/0079122 A1 | 4/2003 | Asokan et al. |
| 2003/0079133 A1* | 4/2003 | Breiter ................... G06F 21/10 713/182 |
| 2003/0084171 A1 | 5/2003 | de Jong |
| 2003/0084302 A1 | 5/2003 | de Jong |
| 2003/0093695 A1 | 5/2003 | Dutta |
| 2003/0115466 A1* | 6/2003 | Aull ..................... H04L 9/0897 713/172 |
| 2003/0125965 A1 | 7/2003 | Falso |
| 2003/0131048 A1 | 7/2003 | Najork |
| 2003/0140003 A1 | 7/2003 | Wang et al. |
| 2003/0140034 A1 | 7/2003 | Probst et al. |
| 2003/0159043 A1 | 8/2003 | Epstein |
| 2003/0177379 A1* | 9/2003 | Hori ..................... H04L 9/0822 713/193 |
| 2003/0182142 A1 | 9/2003 | Valenzuela et al. |
| 2003/0196087 A1 | 10/2003 | Stringer et al. |
| 2003/0200439 A1 | 10/2003 | Moskowitz |
| 2003/0208406 A1 | 11/2003 | Okamoto et al. |
| 2003/0217006 A1 | 11/2003 | Roever et al. |
| 2003/0217269 A1* | 11/2003 | Gantman .......... G06Q 20/40145 713/168 |
| 2003/0220881 A1 | 11/2003 | Pirhonen et al. |
| 2003/0229593 A1 | 12/2003 | Raley |
| 2004/0003180 A1 | 1/2004 | Cypher |
| 2004/0030654 A1* | 2/2004 | Walker ................... H04L 67/14 705/53 |
| 2004/0034601 A1 | 2/2004 | Kreuzer |
| 2004/0039916 A1 | 2/2004 | Aldis et al. |
| 2004/0044627 A1 | 3/2004 | Russell |
| 2004/0044779 A1 | 3/2004 | Lambert |
| 2004/0054630 A1 | 3/2004 | Ginter et al. |
| 2004/0054915 A1 | 3/2004 | Jong et al. |
| 2004/0059678 A1 | 3/2004 | Stefik et al. |
| 2004/0083286 A1* | 4/2004 | Holden ................. H04L 63/126 709/225 |
| 2004/0083391 A1 | 4/2004 | de Jong |
| 2004/0113792 A1 | 6/2004 | Ireland et al. |
| 2004/0128546 A1 | 7/2004 | Blakeley |
| 2004/0133548 A1 | 7/2004 | Fielding et al. |
| 2004/0139207 A1 | 7/2004 | de Jong |
| 2004/0153552 A1 | 8/2004 | Trossen et al. |
| 2004/0168056 A1* | 8/2004 | Dillaway ................ G06F 21/10 713/156 |
| 2004/0177039 A1 | 9/2004 | Pincus |
| 2004/0196981 A1 | 10/2004 | Nakano et al. |
| 2004/0199577 A1 | 10/2004 | Burd et al. |
| 2004/0199869 A1* | 10/2004 | Lucovsky ............. G06F 21/629 715/225 |
| 2004/0221045 A1 | 11/2004 | Joosten et al. |
| 2004/0243517 A1 | 12/2004 | Hansen |
| 2004/0243819 A1 | 12/2004 | Bourne et al. |
| 2004/0249768 A1 | 12/2004 | Kontio et al. |
| 2004/0267671 A1 | 12/2004 | Nonaka et al. |
| 2004/0267673 A1 | 12/2004 | Ballard et al. |
| 2005/0004875 A1 | 1/2005 | Kontio et al. |
| 2005/0010486 A1 | 1/2005 | Pandhe |
| 2005/0027804 A1 | 2/2005 | Cahill et al. |
| 2005/0033700 A1 | 2/2005 | Vogler et al. |
| 2005/0038707 A1 | 2/2005 | Roever et al. |
| 2005/0038724 A1 | 2/2005 | Roever et al. |
| 2005/0091268 A1 | 4/2005 | Meyer et al. |
| 2005/0091545 A1 | 4/2005 | Soppera |
| 2005/0096938 A1 | 5/2005 | Slomkowski et al. |
| 2005/0102509 A1* | 5/2005 | Fascenda ............... G07F 7/1016 713/165 |
| 2005/0125656 A1* | 6/2005 | Mallal .................... H04L 63/12 713/156 |
| 2005/0138374 A1 | 6/2005 | Zheng et al. |
| 2005/0177716 A1 | 8/2005 | Ginter et al. |
| 2005/0188194 A1* | 8/2005 | Fascenda ............ H04W 12/069 713/155 |
| 2005/0204168 A1 | 9/2005 | Johnston et al. |
| 2005/0210254 A1 | 9/2005 | Gabryjelski et al. |
| 2005/0216466 A1* | 9/2005 | Miyamoto ............ G06F 21/552 707/999.009 |
| 2005/0234860 A1 | 10/2005 | Roever et al. |
| 2005/0246193 A1 | 11/2005 | Roever et al. |
| 2005/0247777 A1 | 11/2005 | Pitroda |
| 2005/0251452 A1 | 11/2005 | Roever et al. |
| 2005/0268115 A1 | 12/2005 | Barde et al. |
| 2005/0273805 A1 | 12/2005 | Roever et al. |
| 2005/0276413 A1 | 12/2005 | Neogi |
| 2006/0021065 A1* | 1/2006 | Kamperman ........... G06F 21/10 726/28 |
| 2006/0036447 A1 | 2/2006 | Roever et al. |
| 2006/0036548 A1 | 2/2006 | Roever et al. |
| 2006/0059070 A1 | 3/2006 | Petruck |
| 2006/0064373 A1 | 3/2006 | Kelley |
| 2006/0080592 A1 | 4/2006 | Alves de Moura et al. |
| 2006/0085354 A1* | 4/2006 | Hirai ..................... G06F 21/606 705/59 |
| 2006/0136987 A1 | 6/2006 | Okuda |
| 2006/0167815 A1 | 7/2006 | Peinado et al. |
| 2006/0170759 A1 | 8/2006 | Roever et al. |
| 2006/0174350 A1 | 8/2006 | Roever et al. |
| 2006/0179003 A1 | 8/2006 | Steele et al. |
| 2006/0242074 A1 | 10/2006 | Kokkinen |
| 2006/0259422 A1 | 11/2006 | Sutton et al. |
| 2007/0014397 A1* | 1/2007 | Ukeda ..................... G06F 21/78 711/115 |
| 2007/0016533 A1 | 1/2007 | Fujimura |

(56) References Cited

U.S. PATENT DOCUMENTS

| | | |
|---|---|---|
| 2007/0028108 A1* | 2/2007 | Cowburn .............. G06V 10/42 713/172 |
| 2007/0038630 A1 | 2/2007 | Li et al. |
| 2007/0087840 A1 | 4/2007 | Fayter et al. |
| 2007/0136694 A1 | 6/2007 | Friedman et al. |
| 2007/0147237 A1 | 6/2007 | Haddad et al. |
| 2007/0157320 A1 | 7/2007 | Collins et al. |
| 2007/0162300 A1 | 7/2007 | Roever et al. |
| 2007/0208720 A1 | 9/2007 | Probst et al. |
| 2007/0214083 A1 | 9/2007 | Jones et al. |
| 2007/0223705 A1* | 9/2007 | Kasahara .............. G06F 21/10 380/281 |
| 2007/0233602 A1 | 10/2007 | Zweig et al. |
| 2007/0250453 A1 | 10/2007 | Sako et al. |
| 2007/0255965 A1 | 11/2007 | McGucken |
| 2007/0286076 A1 | 12/2007 | Roever et al. |
| 2007/0286393 A1 | 12/2007 | Roever et al. |
| 2008/0002826 A1* | 1/2008 | Nakamae .............. H04N 21/4405 348/E7.056 |
| 2008/0019526 A1* | 1/2008 | Fu ...................... H04L 9/0822 380/277 |
| 2008/0022086 A1* | 1/2008 | Ho ...................... H04L 9/0897 713/155 |
| 2008/0040504 A1* | 2/2008 | You .................... H04L 41/5003 709/238 |
| 2008/0056501 A1* | 3/2008 | McGough .............. H04L 63/08 380/282 |
| 2008/0067230 A1 | 3/2008 | Silverbrook et al. |
| 2008/0092239 A1* | 4/2008 | Sitrick .................. G06F 21/10 713/193 |
| 2008/0092240 A1* | 4/2008 | Sitrick .................. H04L 9/0866 726/27 |
| 2008/0134297 A1* | 6/2008 | Clinick ............ G11B 20/00166 726/4 |
| 2008/0148056 A1 | 6/2008 | Ginter et al. |
| 2008/0148067 A1* | 6/2008 | Sitrick .................. G06F 21/10 705/52 |
| 2008/0205850 A1 | 8/2008 | Collins et al. |
| 2008/0222043 A1* | 9/2008 | Chefalas ............... G06F 21/10 705/59 |
| 2008/0235043 A1 | 9/2008 | Goulandris et al. |
| 2008/0243693 A1 | 10/2008 | Thrasher et al. |
| 2008/0263645 A1* | 10/2008 | Renter ................ H04L 63/0428 705/66 |
| 2009/0006200 A1* | 1/2009 | Baker .................... H04M 15/61 705/14.69 |
| 2009/0070218 A1 | 3/2009 | Farmanfarmaian |
| 2009/0106557 A1* | 4/2009 | Leonard ................ H04L 63/12 713/176 |
| 2009/0119500 A1 | 5/2009 | Roth et al. |
| 2009/0193249 A1 | 7/2009 | Conrado et al. |
| 2009/0193526 A1 | 7/2009 | Sweazey |
| 2009/0199274 A1* | 8/2009 | Frazier .................. H04L 63/08 726/4 |
| 2009/0254930 A1* | 10/2009 | Lo ...................... H04N 7/17318 725/2 |
| 2009/0265636 A1* | 10/2009 | Ruiz-Velasco ......... G06Q 30/06 715/738 |
| 2009/0274304 A1* | 11/2009 | Kobayashi .............. G06F 21/10 726/26 |
| 2009/0275402 A1 | 11/2009 | Backover et al. |
| 2009/0288012 A1 | 11/2009 | Hertel et al. |
| 2010/0031021 A1* | 2/2010 | Arnold ................ H04L 9/0637 713/190 |
| 2010/0071069 A1* | 3/2010 | Sugiura ................ G06F 21/105 726/26 |
| 2010/0100565 A1* | 4/2010 | Adachi ................ G06F 21/105 707/E17.014 |
| 2010/0138934 A1* | 6/2010 | Minoshima .............. G06F 21/10 726/30 |
| 2010/0161444 A1 | 6/2010 | Roever et al. |
| 2010/0162408 A1 | 6/2010 | Roever et al. |
| 2010/0235284 A1* | 9/2010 | Moore .................. G06Q 20/401 709/204 |
| 2010/0257111 A1 | 10/2010 | Veugen et al. |
| 2010/0293381 A1* | 11/2010 | Hammad .............. G06Q 20/40 713/172 |
| 2010/0293382 A1* | 11/2010 | Hammad .............. H04L 9/3234 713/172 |
| 2010/0299718 A1 | 11/2010 | Roever et al. |
| 2011/0065420 A1* | 3/2011 | Reyes .................... G06F 21/41 455/411 |
| 2011/0067117 A1* | 3/2011 | Nagumo .............. H04N 1/00344 726/30 |
| 2011/0071924 A1* | 3/2011 | Desmond .............. G06Q 20/322 707/E17.107 |
| 2011/0099384 A1* | 4/2011 | Grange ................ H04L 9/3234 713/184 |
| 2011/0106710 A1* | 5/2011 | Reed .................... H04L 9/3226 705/44 |
| 2011/0112917 A1 | 5/2011 | Driessen |
| 2011/0173684 A1* | 7/2011 | Hurry .................... G06F 21/34 726/6 |
| 2011/0178861 A1 | 7/2011 | Georgi |
| 2011/0197285 A1 | 8/2011 | Ginter et al. |
| 2011/0251882 A1* | 10/2011 | Richard .............. G06Q 30/0233 705/14.1 |
| 2011/0282915 A1* | 11/2011 | Steer .................... H04L 63/06 713/168 |
| 2011/0296515 A1 | 12/2011 | Krstic et al. |
| 2011/0314271 A1* | 12/2011 | Boccon-Gibod ..... H04L 9/3247 713/151 |
| 2011/0320345 A1* | 12/2011 | Taveau ................ G06Q 20/3226 705/39 |
| 2011/0320808 A1* | 12/2011 | Swingler .............. H04L 63/12 713/170 |
| 2012/0018506 A1* | 1/2012 | Hammad ............ G06Q 20/3674 235/375 |
| 2012/0040748 A1* | 2/2012 | Kanisawa ............ G07F 17/3244 705/30 |
| 2012/0090018 A1 | 4/2012 | Padhye et al. |
| 2012/0114119 A1* | 5/2012 | Ahuja .................. H04L 63/1416 726/20 |
| 2012/0124386 A1* | 5/2012 | Lin ...................... H04L 9/3271 726/17 |
| 2012/0197794 A1* | 8/2012 | Grigg .................... G06Q 20/40 705/41 |
| 2012/0198513 A1 | 8/2012 | Maida-Smith et al. |
| 2012/0233684 A1* | 9/2012 | Denis .................. H04W 12/069 726/9 |
| 2012/0310970 A1* | 12/2012 | Mikkelsen .......... G06F 21/6218 707/769 |
| 2013/0036476 A1 | 2/2013 | Roever et al. |
| 2014/0019372 A1 | 1/2014 | Roever et al. |
| 2014/0019759 A1* | 1/2014 | Burmester .............. H04L 63/08 713/172 |
| 2014/0040873 A1* | 2/2014 | Goldman .............. H04L 9/3263 717/168 |
| 2014/0236746 A1 | 8/2014 | Roever et al. |
| 2015/0026080 A1 | 1/2015 | Roever et al. |
| 2016/0048812 A1 | 2/2016 | Collins et al. |
| 2017/0083720 A1 | 3/2017 | Roever et al. |
| 2018/0019891 A1 | 1/2018 | Roever et al. |
| 2019/0138742 A1* | 5/2019 | Roever .................. H04L 63/12 |
| 2019/0295051 A1 | 9/2019 | Collins et al. |
| 2019/0295120 A1 | 9/2019 | Collins et al. |
| 2020/0151756 A1 | 5/2020 | Thrasher et al. |
| 2020/0186384 A1 | 6/2020 | Roever et al. |

FOREIGN PATENT DOCUMENTS

| | | |
|---|---|---|
| JP | 2002-140631 | 5/2002 |
| KR | 10-2009-0028100 | 3/2009 |
| WO | WO 98/43211 | 10/1998 |
| WO | WO 01/11452 | 2/2001 |
| WO | WO 01/84906 | 11/2001 |
| WO | WO-0201033 A1 | 1/2002 |
| WO | WO 2002/011033 | 2/2002 |
| WO | WO 03/098398 | 11/2003 |

(56) References Cited

FOREIGN PATENT DOCUMENTS

| WO | WO 2004/038567 | 5/2004 |
|---|---|---|
| WO | WO 2005/116841 | 12/2005 |
| WO | WO 2007/033005 | 3/2007 |
| WO | WO 2007/033055 | 3/2007 |
| WO | WO 2007/078987 | 7/2007 |
| WO | WO 2007/130416 | 11/2007 |
| WO | WO 2007/130502 | 11/2007 |
| WO | WO 2013/019519 | 2/2013 |

OTHER PUBLICATIONS

U.S. Office Action dated Sep. 15, 2009 issued in U.S. Appl. No. 10/873,841.
U.S. Office Action dated Mar. 27, 2009 issued in U.S. Appl. No. 11/096,284.
U.S. Office Action dated Feb. 25, 2008 issued in U.S. Appl. No. 10/873,840.
U.S. Final Office Action dated Dec. 3, 2008 issued in U.S. Appl. No. 10/873,840.
U.S. Office Action dated May 28, 2009 issued in U.S. Appl. No. 10/873,840.
U.S. Office Action dated Feb. 9, 2005 issued in U.S. Appl. No. 10/232,861.
U.S. Office Action dated Jul. 27, 2005 issued in U.S. Appl. No. 10/232,861.
U.S. Office Action dated Dec. 2, 2005 issued in U.S. Appl. No. 10/232,861.
U.S. Final Office Action dated Jun. 21, 2006 issued in U.S. Appl. No. 10/232,861.
U.S. Office Action dated Nov. 30, 2006 issued in U.S. Appl. No. 10/232,861.
U.S. Final Office Action dated Jun. 14, 2007 issued in U.S. Appl. No. 10/232,861.
U.S. Office Action dated May 15, 2008 issued in U.S. Appl. No. 10/232,861.
U.S. Final Office Action dated Dec. 5, 2008 issued in U.S. Appl. No. 10/232,861.
U.S. Office Action dated Jun. 24, 2009 issued in U.S. Appl. No. 10/232,861.
U.S. Final Office Action dated Dec. 14, 2009 issued in U.S. Appl. No. 10/232,861.
U.S. Office Action dated Aug. 24, 2009 issued in U.S. Appl. No. 11/155,010.
U.S. Office Action dated May 26, 2010 issued in U.S. Appl. No. 11/155,010.
U.S. Miscellaneous Communication dated Jun. 11, 2010 issued in U.S. Appl. No. 11/155,010.
U.S. Office Action dated Apr. 5, 2013 issued in U.S. Appl. No. 11/155,010.
U.S. Office Action dated Dec. 18, 2013 issued in U.S. Appl. No. 11/155,010.
U.S. Final Office Action dated Jul. 23, 2014 issued in U.S. Appl. No. 11/155,010.
U.S. Office Action dated Jul. 1, 2016 issued in U.S. Appl. No. 11/155,010.
U.S. Final Office Action dated Feb. 22, 2017 issued in U.S. Appl. No. 11/155,010.
U.S. Office Action dated May 22, 2006 issued in U.S. Appl. No. 10/414,817.
U.S. Office Action dated Nov. 28, 2006 issued in U.S. Appl. No. 10/414,817.
U.S. Final Office Action dated Apr. 30, 2007 issued in U.S. Appl. No. 10/414,817.
U.S. Office Action dated Oct. 3, 2007 issued in U.S. Appl. No. 10/414,817.
U.S. Final Office Action dated Jun. 11, 2008 issued in U.S. Appl. No. 10/414,817.
U.S. Office Action dated Dec. 24, 2008 issued in U.S. Appl. No. 10/414,817.
U.S. Final Office Action dated Jun. 12, 2009 issued in U.S. Appl. No. 10/414,817.
U.S. Notice of Allowance dated Jan. 27, 2010 issued in U.S. Appl. No. 10/414,817.
U.S. Office Action dated Oct. 1, 2010 issued in U.S. Appl. No. 12/716,089.
U.S. Final Office Action dated May 18, 2011 issued in U.S. Appl. No. 12/716,089.
U.S. Office Action dated Jul. 1, 2013 issued in U.S. Appl. No. 12/716,089.
U.S. Notice of Allowance dated Feb. 5, 2014 issued in U.S. Appl. No. 12/716,089.
U.S. Office Action dated Apr. 6, 2016 issued in U.S. Appl. No. 14/245,885.
U.S. Final Office Action dated Nov. 17, 2016 issued in U.S. Appl. No. 14/245,885.
U.S. Office Action dated Jan. 10, 2018 issued in U.S. Appl. No. 14/245,885.
U.S. Office Action dated Dec. 22, 2005 issued in U.S. Appl. No. 10/414,830.
U.S. Office Action dated Feb. 7, 2007 issued in U.S. Appl. No. 10/414,380.
U.S. Office Action dated Oct. 4, 2010 issued in U.S. Appl. No. 11/679,760.
U.S. Final Office Action dated May 27, 2011 issued in U.S. Appl. No. 11/679,760.
U.S. Office Action dated Jan. 5, 2012 issued in U.S. Appl. No. 11/679,760.
U.S. Final Office Action dated Sep. 27, 2012 issued in U.S. Appl. No. 11/679,760.
U.S. Office Action dated May 20, 2013 issued in U.S. Appl. No. 11/679,760.
U.S. Final Office Action dated Feb. 26, 2014 issued in U.S. Appl. No. 11/679,760.
U.S. Office Action dated Jan. 5, 2015 issued in U.S. Appl. No. 11/679,760.
U.S. Office Action dated Jun. 9, 2015 issued in U.S. Appl. No. 11/679,760.
U.S. Final Office Action dated Jan. 11, 2016 issued in U.S. Appl. No. 11/679,760.
U.S. Office Action dated Dec. 20, 2005 issued in U.S. Appl. No. 10/440,286.
U.S. Final Office Action dated Jul. 13, 2006 issued in U.S. Appl. No. 10/440,286.
U.S. Office Action dated Jan. 30, 2007 issued in U.S. Appl. No. 10/440,286.
U.S. Final Office Action dated Jun. 28, 2007 issued in U.S. Appl. No. 10/440,286.
U.S. Office Action dated Dec. 27, 2007 issued in U.S. Appl. No. 10/440,286.
U.S. Final Office Action dated Aug. 6, 2008 issued in U.S. Appl. No. 10/440,286.
U.S. Office Action dated Nov. 18, 2008 issued in U.S. Appl. No. 10/440,286.
U.S. Final Office Action dated Feb. 11, 2009 issued in U.S. Appl. No. 10/440,286.
U.S. Advisory Action Before the Filing of an Appeal Brief dated May 28, 2009 issued in U.S. Appl. No. 10/440,286.
U.S. Notice of Allowance dated Dec. 24, 2009 issued in U.S. Appl. No. 10/440,286.
U.S. Office Action dated Jul. 13, 2011 issued in U.S. Appl. No. 12/717,007.
U.S. Office Action dated Oct. 4, 2011 issued in U.S. Appl. No. 12/717,007.
U.S. Final Office Action dated May 2, 2012 issued in U.S. Appl. No. 12/717,007.
U.S. Notice of Allowance dated Jul. 8, 2013 issued in U.S. Appl. No. 12/717,007.
U.S. Office Action dated Mar. 9, 2016 issued in U.S. Appl. No. 14/031,908.
U.S. Final Office Action dated Aug. 29, 2016 issued in U.S. Appl. No. 14/031,908.

(56) References Cited

OTHER PUBLICATIONS

U.S. Office Action dated Feb. 9, 2017 issued in U.S. Appl. No. 14/031,908.
U.S. Office Action dated Jan. 14, 2008 issued in U.S. Appl. No. 10/439,629.
U.S. Final Office Action dated Oct. 23, 2008 issued in U.S. Appl. No. 10/439,629.
U.S. Office Action dated Jan. 28, 2009 issued in U.S. Appl. No. 10/439,629.
U.S. Notice of Allowance dated May 10, 2010 issued in U.S. Appl. No. 10/439,629.
U.S. Office Action dated Sep. 30, 2011 issued in U.S. Appl. No. 12/850,454.
U.S. Final Office Action dated Aug. 31, 2012 issued in U.S. Appl. No. 12/850,454.
U.S. Office Action dated Sep. 23, 2014 issued in U.S. Appl. No. 12/850,454.
U.S. Final Office Action dated Mar. 6, 2015 issued in U.S. Appl. No. 12/850,454.
U.S. Office Action dated Oct. 12, 2016 issued in U.S. Appl. No. 12/850,454.
U.S. Final Office Action dated Jun. 19, 2017 issued in U.S. Appl. No. 12/850,454.
U.S. Office Action dated Sep. 13, 2018 issued in U.S. Appl. No. 12/850,454.
U.S. Final Office Action dated Jun. 27, 2019 issued in U.S. Appl. No. 12/850,454.
U.S. Office Action dated Jan. 2, 2019 issued in U.S. Appl. No. 12/850,454.
U.S. Final Office Action dated Oct. 3, 2019 issued in U.S. Appl. No. 12/850,454.
U.S. Office Action dated Mar. 22, 2011 issued in U.S. Appl. No. 11/741,952.
U.S. Final Office Action dated Sep. 27, 2011 issued in U.S. Appl. No. 11/741,952.
U.S. Office Action dated Oct. 18, 2013 issued in U.S. Appl. No. 11/741,952.
U.S. Final Office Action dated May 20, 2014 issued in U.S. Appl. No. 11/741,952.
U.S. Office Action dated Sep. 5, 2014 issued in U.S. Appl. No. 11/741,952.
U.S. Final Office Action dated Feb. 18, 2015 issued in U.S. Appl. No. 11/741,952.
U.S. Office Action dated Aug. 11, 2015 issued in U.S. Appl. No. 11/741,952.
U.S. Final Office Action dated Dec. 21, 2015 issued in U.S. Appl. No. 11/741,952.
U.S. Notice of Allowance dated Jan. 20, 2017 issued in U.S. Appl. No. 11/741,952.
U.S. Office Action dated Oct. 27, 2017 issued in U.S. Appl. No. 15/448,473.
U.S. Final Office Action dated Jun. 5, 2018 issued in U.S. Appl. No. 15/448,473.
U.S. Examiner's Answer to Appeal Brief (filed Jan. 23, 2019) Before the Patent Trial and Appeal Board on Apr. 17, 2019 issued in U.S. Appl. No. 15/448,473.
U.S. Office Action dated Jul. 8, 2019 issued in U.S. Appl. No. 15/448,473.
U.S. Final Office Action dated Apr. 2, 2020 issued in U.S. Appl. No. 15/448,473.
U.S. Office Action dated Oct. 13, 2020 issued in U.S. Appl. No. 15/448,473.
U.S. Office Action dated Aug. 11, 2011 issued in U.S. Appl. No. 11/742,253.
U.S. Final Office Action dated May 21, 2012 issued in U.S. Appl. No. 11/742,253.
U.S. Office Action dated Aug. 31, 2015 issued in U.S. Appl. No. 11/742,253.
U.S. Final Office Action dated Feb. 23, 2016 issued in U.S. Appl. No. 11/742,253.
U.S. Office Action dated Jan. 26, 2018 issued in U.S. Appl. No. 11/742,253.
U.S. Final Office Action dated Aug. 15, 2018 issued in U.S. Appl. No. 11/742,253.
U.S. Notice of Allowance dated Jul. 8, 2019 issued in U.S. Appl. No. 11/742,253.
U.S. Office Action dated Sep. 21, 2010 issued in U.S. Appl. No. 11/645,139.
U.S. Final U.S. Office Action dated May 5, 2011 issued in U.S. Appl. No. 11/645,139.
U.S. Office Action dated Nov. 7, 2014 issued in U.S. Appl. No. 11/645,139.
U.S. Notice of Allowance dated Jul. 10, 2015 issued in U.S. Appl. No. 11/645,139.
U.S. Office Action dated Dec. 29, 2016 issued in U.S. Appl. No. 14/831,713.
U.S. Final Office Action dated Jun. 15, 2017 issued in U.S. Appl. No. 14/831,713.
U.S. Notice of Allowance dated Sep. 12, 2018 issued in U.S. Appl. No. 14/831,713.
U.S. Office Action dated Nov. 29, 2010 issued in U.S. Appl. No. 11/940,747.
U.S. Final Office Action dated Aug. 23, 2011 issued in U.S. Appl. No. 11/940,747.
U.S. Office Action dated Mar. 26, 2015 issued in U.S. Appl. No. 11/940,747.
U.S. Final Office Action dated Feb. 1, 2016 issued in U.S. Appl. No. 11/940,747.
U.S. Office Action dated Dec. 29, 2016 issued in U.S. Appl. No. 11/940,747.
U.S. Final Office Action dated Oct. 6, 2017 issued in U.S. Appl. No. 11/940,747.
U.S. Notice of Allowance dated Sep. 11, 2018 issued in U.S. Appl. No. 11/940,747.
U.S. Corrected Notice of Allowance dated Sep. 25, 2018 issued in U.S. Appl. No. 11/940,747.
U.S. Office Action dated May 1, 2020 issued in U.S. Appl. No. 16/206,925.
U.S. Office Action dated Jul. 12, 2010 issued in U.S. Appl. No. 11/940,753.
U.S. Final Office Action dated Jan. 24, 2011 issued in U.S. Appl. No. 11/940,753.
U.S. Office Action dated Nov. 7, 2014 issued in U.S. Appl. No. 11/940,753.
U.S. Final Office Action dated May 22, 2015 issued in U.S. Appl. No. 11/940,753.
U.S. Office Action dated Dec. 4, 2015 issued in U.S. Appl. No. 11/940,753.
U.S. Final Office Action dated Apr. 13, 2016 issued in U.S. Appl. No. 11/940,753.
U.S. Office Action dated Apr. 18, 2017 issued in U.S. Appl. No. 11/940,753.
U.S. Office Action dated Sep. 21, 2018 issued in U.S. Appl. No. 11/940,753.
U.S. Notice of Allowance dated May 1, 2019 issued in U.S. Appl. No. 11/940,753.
U.S. Office Action dated May 22, 2013 issued in U.S. Appl. No. 13/558,238.
U.S. Final Office Action dated Feb. 28, 2014 issued in U.S. Appl. No. 13/558,238.
U.S. Office Action dated Nov. 5, 2014 issued in U.S. Appl. No. 13/558,238.
U.S. Final Office Action dated Feb. 24, 2015 issued in U.S. Appl. No. 13/558,238.
U.S. Office Action dated Jul. 2, 2015 issued in U.S. Appl. No. 13/558,238.
U.S. Final Office Action dated Mar. 9, 2016 issued in U.S. Appl. No. 13/558,238.
U.S. Notice of Allowance dated Sep. 19, 2016 issued in U.S. Appl. No. 13/558,238.
U.S. Office Action dated May 19, 2017 issued in U.S. Appl. No. 15/298,103.

(56) References Cited

OTHER PUBLICATIONS

U.S. Notice of Allowance dated Jul. 2, 2018 issued in U.S. Appl. No. 15/298,103.
U.S. Office Action dated Oct. 21, 2019 issued in U.S. Appl. No. 16/100,658.
U.S. Notice of Allowance dated Mar. 19, 2020 issued in U.S. Appl. No. 16/100,658.
U.S. Corrected Notice of Allowance dated May 7, 2020 issued in U.S. Appl. No. 16/100,658.
PCT International Search Report and Written Opinion dated Feb. 16, 2006 issued in PCT Application No. PCT/US2005/021057.
PCT Notification Concerning Transmittal of Copy of International Preliminary Report on Patentability dated Jan. 11, 2007 issued in PCT Application No. PCT/US2005/021057.
PCT International Search Report and Written Opinion dated Nov. 25, 2003 issued in PCT Application No. PCT/US03/15614.
Chinese First Office Action dated Dec. 26, 2008 issued in CN Application No. 03816746.8.
European Communication dated Oct. 19, 2006 issued in EP Application No. 03 72 6905.7.
European Office Action dated Oct. 27, 2008 issued in EP Application No. 03 72 6905.7.
European Office Action dated Nov. 6, 2008 issued in EP Application No. 03 72 6905.7.
European Office Action dated Apr. 9, 2010 issued in EP Application No. 03 72 6905.7.
JP Office Action dated Mar. 24, 2009 issued in JP Application No. 2004-505848.
PCT International Search Report and Written Opinion dated Sep. 16, 2008 issued in PCT/US07/10560.
PCT International Preliminary Report on Patentability and Written Opinion dated Nov. 4, 2008 issued in PCT/US07/10560.
PCT International Search Report and Written Opinion dated Dec. 7, 2007 issued in PCT/US07/010708.
PCT International Preliminary Report on Patentability and Written Opinion dated Nov. 13, 2008 issued in PCT/US2007/010708.
PCT International Search Report and Written Opinion dated Feb. 20, 2008 issued in PCT/US06/48776.
PCT International Preliminary Report on Patentability and Written Opinion dated Jul. 10, 2008 issued in PCT/US2006/048776.
European Extended Search Report dated Nov. 28, 2013 issued in EP 06 847 910.4.
PCT International Search Report and Written Opinion dated Jan. 17, 2013 issued in PCT/US2012/048182.
PCT International Preliminary Report on Patentability and Written Opinion dated Feb. 13, 2014 issued in PCT/US2012/048182.
Ahn et al. Managing privacy preferences for federated identity management, in Proc. DIM '05: Proceedings of the 2005 workshop on Digital identity management, Fairfax, VA, USA, 2005, pp. 28-36.
Alladin/Preview Systems, HASP SL, Alladin/Preview Systems, 2004.
Bohrer, K. and Holland, B. "Customer Profile Exchange (CPExchange) Specification", *International Digital Enterprise Alliance, Inc.*, Version 1.0, Oct. 20, 2000.
Burdett, D. RFC 2801: Internet Open Trading Protocol, [Online]. Apr. 2000. Available: http://www.faqs.org/rfcsl_rfc2801.html.
Business.com, Preview Systems, Inc. Profile, [Online]. 2006. Available: http://www.business.com/directory/telecommunicationslpreview_systems_inc/profile/.
Cobèna, (2003) "Thèse d'Informatique, spècialitè Algorithmique, Change Management of Semi-Structure Data on the Web", soutenue le Jun. 26, 2003 par, *Ecole Doctorale de l'Ecole Polytechnique*, 228 pages.
Cox B., Tygar J., Sirbu M., "Netbill Security and Transaction Protocol." First USENIX Workshop on Electronic Commerce, Jul. 1995.
Fielding, (Jan. 2000) "Architectural Styles and the Design of Network-based Software Architectures", University of California, Irvine, Dissertation, 90 pages.

FlexTicket. [Online] Available: http://info.isl.ntt.co.jp/flexticket/index.html, Last Modified Dec. 25, 2001.
Fujimura et al. XML Ticket: Generalized Digital Ticket Definition Language, 1999.
Fujimura et al. "A Worldwide Supermarket Scheme Using Rights Trading System", in Proc. ICPADS '00: Proceedings of the Seventh International Conference on Parallel and Distributed Systems: Workshops, Washington, DC, USA 2000, p. 289.
Fujimura et al. "General Purpose Digital Ticket Framework", Boston, MA: 3rd USENIX Workshop on Electronic Commerce, 1998.
Fujimura et al., "Digital Ticket Controlled Digital Ticket Circulation", USENIX, 1999.
Fujimura, K. and Eastlake, D., RFC 3506: Requirements and Design for Voucher Trading System [VTS], United States: Network Working Group, Mar. 2003, [online] Available at http://rfc.net/rfc3506.html.
Haller et al., (May 1996) "A One-Time Password System", *Kaman Sciences Corporation, Network Working Group*, Request for Comments 1938, Category: Standards Track, 18 pp.
Hardjono, T. and Seberry, J., "Strongboxes for Electronic Commerce", Oakland, CA: 2nd USENIX Workshop on Electronic Commerce, 1996.
Hettinga, "UNDRs and Bearer" other stuff besides cash [was Re: ESIGN Act], http://legalminds.Jp.findlaw.com/list/cyberia-1/msg:31650.html, May 29, 2001.
IETF Internet Open Trading Protocol Working Group Publishes RFC for Voucher Trading System, Cover Pages. [Online]. May 2003. Available: http://xml.coverpages.org/ni2003-05-15-a.html.
Iguchi et al. Voucher Integrated C2B and C2C Trading Model. May 2002 [Online]. Available: http://wwwconf.ecs.soton.ac.uk/archive/00000272/01/index.html.
Internet Open Trading Protocol, Cover Pages. [Online] Dec. 2002, Available: http://xml.coverpages.org/otp.html.
Josang et al. "Trust Requirements in Identity Management." Australian Information Security Workshop, 2005.
Kumar et al. Sales Promotions on the Internet, Boston, MA: 3rd USENIX Workshop on Electronic Commerce, 1998.
Kuno et al., "A Digital Ticket Circulation Architecture, 58th Conference Collected Papers (4)", *Information Processing Society of Japan*, Japan, Mar. 11, 1999, pp. 4-295-4-296.
Lamport, "Password Authentication with Insecure Communication", Communications of the ACM, Nov. 1981, vol. 24, No. 11, pp. 770-772.
Manasse ("Why Rights Management is Wrong (and What to Do Instead)", SRC Technical Note, Compaq System Research Center, Jan. 21, 2001, 7 pages).
Matsuyama et al., "Distributed digital-ticket management for rights trading system", in Proc. EC '99: Proceedings of the 1st ACM conference on Electronic commerce, Denver, Colorado, United States, 1999, pp. 110-118.
Medvinsky, G. and Neuman, B.C., "NetCash: A design for practical electronic currency on the Internet", *Proceedings of the First ACM Conference on Computer and Communications Security*, Nov. 1993.
Menezes et al., Handbook of Applied Cryptography, 1997 CRC Press LLC, Section 1.7.
Miller, Mark S. and Shapiro, Jonathan S. (2003) "Paradigm Regained: Abstraction Mechanisms for Access Control," *HP Laboratories*, Palo Alto, HPL-2003-222, 22 pages; to be published in and presented at ASIAN'03, Dec. 10-13, 2003, Mumbai, India [Downloaded on Jul. 12, 2017 from http://www.hpl.hp.com/techreports/2003/HPL-2003-222].
Mont et al., "Towards Accountable Management of Identity and Privacy: Sticky Policies and Enforceable Tracing Services", Hewlett Packard, 2003.
OECD (Jan. 27, 2006) OECD Guidelines on the Protection of Privacy and Transborder Flows of Personal Data [br], [online]. Available: http://www.oecd.org/document/18/0.2340, en_2649_201185_1815186_1_1_1_1.00.
Rahn, http://www.nettime.org/Lists-Archives/nettime-1-0009/msg00214.html, Sep. 22, 2000.
Skinner et al., "A Framework of privacy shield in organizational information systems," *Proceedings of Int'l Conference on Mobile Business*, 2005.

(56) References Cited

OTHER PUBLICATIONS

Software Requirements Specification for <Project> template, Version 1.1 approved, Copyright © 2002 by Karl E. Wiegers, section 2.4, Operating Environments, downloaded from www.processimpact.com, 8 pp.
Stewart, "The Future of Digital Cash on the Internet". [online] Available: http://www.arraydev.com/commerce/JIBC/9703-02.htm, printed Jan. 26, 2006.
Szabo, "Contracts with Bearer" http://szabo.best.vwh.net/bearer_contracts.html, 12 pages [1997].
Terada et al. "Copy Prevention Scheme for Rights Trading Infrastucture", 2000.
Terada et al., RFC 4153: "XML Voucher: Generic Voucher Language", Network Working Group, Sep. 2005.
Terada et al., RFC 4154: Voucher Trading System Application Programming Interface, Sep. 2005 [online] Available: http://www.rfc-archive.org/getrfc.php?rfc=4154.
"The OAuth 2.0 Authorization Protocol", (Abstract) draft-ietf-oauth-v2-28, *Network Working Group, E. Hammer, Ed.,* Jun. 19, 2012, 48 pages.
The UNIX Operating System: Mature, Standardized and State-of-the-Art, White Paper issued in Aug. 1997 downloaded on Sep. 21, 2011 from http://www.unix.org/whitepapers/wp-0897.html, 4 pp.
Tilkov, Stefan, "A Brief Introduction to REST", posted on Dec. 10, 2007 at http://www.infoq.com/articles/rest-introduction, 10 pages.
"US Navy: Military Exchanges now offer best price guarantee," M2 Presswire, Conventry, Jun. 4, 1998, p. 1 [recovered from Proquest May 17, 2006].
Weitzel, "Liberty ID-WSF Implementation Guide," Liberty Alliance Project, Jan. 1, 2005.
Wikipedia—Hash Chain: http://en.wikipedia.org/wiki/Hash_chain, downloaded Feb. 27, 2011.
XML Voucher: Generic Voucher Language, Cover Pages [Online] May 2003, Available: http://xml.coverpages.org/xmlVoucher.html.
Lohtia. R, et al., "The Impact Of Content And Design Elements On Banner Advertising Click Through Rates", Journal of advertising Research, Dec. 2003, vol. 43(4), pp. 410-418.
Office Action dated Feb. 7, 2007 from U.S. Appl. No. 10/414,830.
U.S. Appl. No. 11/830,717, inventors Roever et al., filed Jul. 30, 2007.
U.S. Appl. No. 14/831,713, inventors Collins et al., filed Aug. 20, 2015.
U.S. Appl. No. 15/448,473, inventors Roever et al., filed Mar. 2, 2017.
U.S. Appl. No. 16/100,658, inventors Roever et al., filed Aug. 10, 2018.
U.S. Appl. No. 16/946,018, inventors Roever et al., filed Feb. 6, 2020.
U.S. Final Office Action dated Apr. 16, 2009 issued in U.S. Appl. No. 11/118,608.
U.S. Final office Action dated Dec. 8, 2020, in U.S. Appl. No. 16/206,925.
U.S. Notice of Allowance dated Jul. 13, 2022 in U.S. Appl. No. 16/206,925.
U.S. Office Action dated Mar. 16, 2009 issued in U.S. Appl. No. 11/146,399.
U.S. Office Action dated May 14, 2008 issued in U.S. Appl. No. 11/118,608.
U.S. Office Action dated Nov. 10, 2008 issued in U.S. Appl. No. 11/118,608.
U.S. Office Action dated Sep. 26, 2007 issued in U.S. Appl. No. 11/118,608.
U.S. Restriction requirement dated Aug. 5, 2010, in U.S. Appl. No. 11/940,747.

\* cited by examiner

RIGHTS-BASED SYSTEM

INCORPORATION BY REFERENCE

An Application Data Sheet is filed concurrently with this specification as part of this application. Each application to which this application claims benefit or priority as identified in the concurrently filed Application Data Sheet is incorporated by reference herein in its entirety and for all purposes.

SUMMARY OF THE INVENTION

According to various embodiments of the present invention, a rights-based system employs vouchers for creating, managing, distributing, and redeeming rights in digital contexts. A voucher is a digital, possession-based rights representation. An authorization component of the system validates the vouchers and issues corresponding tokens. Access to digital resources is provided in response to presentation of the tokens which are validated by matching voucher refresh values to corresponding values maintained by the system. New refresh values are generated and inserted in the vouchers each time they are redeemed.

According to a particular class of embodiments, a rights-based system includes one or more computing devices operating in a network and configured to implement a plurality of rights-based system components including a mint component, an authorization component, a lockbox component, an escrow component, and a protected resource component. The mint component is configured to issue vouchers, each of which is a possession-based rights representation. First ones of the vouchers include a refresh value and a sequence number. The authorization component is configured to validate the vouchers and issue corresponding tokens. The lockbox component is configured to enable one or more users to manage corresponding collections of the vouchers. The escrow component is configured to coordinate trades of the vouchers. The protected resource component is configured to provide access to digital resources in response to presentation of corresponding ones of the tokens issued by the authorization component. The authorization component is configured to validate the first vouchers by matching the corresponding refresh values to corresponding most recent values maintained by the authorization component, and to generate new refresh values and insert the new refresh values in the corresponding first vouchers each time the first vouchers are redeemed. The authorization component is further configured increment the sequence numbers of the first vouchers each time the first vouchers are redeemed.

A further understanding of the nature and advantages of the present invention may be realized by reference to the remaining portions of the specification and the drawings.

DESCRIPTION OF SPECIFIC EMBODIMENTS

Figure 1:
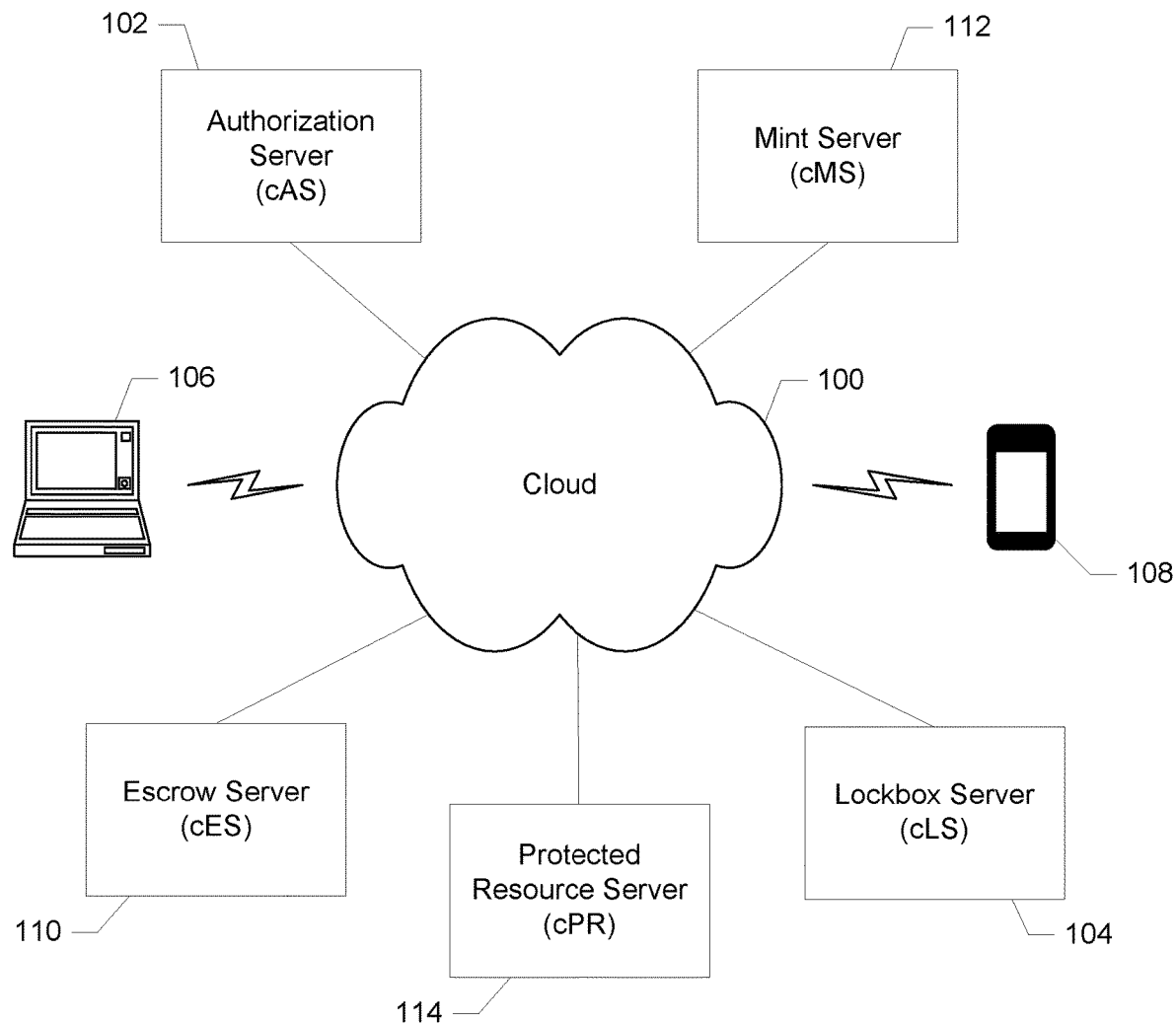
FIG. 1 is a simplified diagram of a rights-based system implemented according to a particular class of embodiments.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention provide secure and scalable techniques for creating, managing, distributing, and redeeming rights in any of a wide variety of digital contexts including, for example, the Internet and the World Wide Web. The embodiments of the invention described herein employ digital objects (referred to herein as "vouchers") that are possession-based rights representations, the possession of which is generally sufficient to validate their redemption. That is, the holder of such an object can redeem one or more rights represented by the object (i.e., gain access to a protected resource represented by the object) by causing the object to be presented to an appropriate system component.

A rights-based system based on vouchers decouples authorization requirements from the underlying protected resources, and allows users to centrally manage their privileges, independent of the resources they are entitled to access. In addition, by making the object that gives access to an underlying resource separate from the resource, protection of the resource becomes a more simplified and scalable task. For example, the loose coupling between vouchers and the resources they represent obviates the need for the resource provider to maintain user databases. That is, vouchers enable a paradigm in which user identity information (e.g., username and password) are removed from the resource. As a consequence, the resources represented by vouchers do not have to "learn" who has the right to access them.

According to some embodiments, a distributed infrastructure is provided in which vouchers may be securely stored, managed, transferred, and traded independently of the underlying resources. As will become clear, this infrastructure enables users holding vouchers to initiate transactions (including anonymous transactions) involving the transfer or trade of vouchers, e.g., either as currency or as representations of the underlying resources. In addition, according to some implementations, different but related access rights for a particular resource may be grouped into a single object.

According to a specific implementation, a voucher may be categorized as one of three voucher types depending on whether the voucher can be copied, and whether the voucher is tied to a particular identity. A "pass" voucher is a voucher that may be freely copied and the rights of which may be redeemed by anyone possessing a copy. A "ticket" voucher is a voucher which can only be redeemed by one holder, but for which the holder's identity is unrestricted. This is comparable, for example, to a theater ticket that only allows one person to enter a theater (although there is no inherent restriction on the number of redemptions for a single ticket voucher by its current legitimate holder). A ticket voucher may be copyable, but only one copy can be redeemed. A "permit" voucher is a voucher the rights for which may only be redeemed by a holder who possesses the unique credentials associated with the identity given in a user identity field of the voucher. This is comparable, for example, to an airline ticket that is good only for the person named.

FIG. 1 is a simplified diagram of a rights-based system designed according to a particular class of embodiments of the present invention. The system, also referred to as a Rights over Internet Protocol (RoIP) system, enables the creation, distribution, and redemption of rights using vouchers. As will be discussed, each voucher identifies specific system components (e.g., using URLs "owned" by the components) that have sufficient information about the specific voucher to be able to validate it in the course of one or more of the corresponding rights being created, distributed, or redeemed.

The system is a loose confederation of multiple system components that may connect and communicate with each other using a wide variety of communication protocols and network infrastructures. This is illustrated in FIG. 1 by "cloud" 100 which represents any of a wide variety of distributed computing environments in which the processes and/or functionalities described herein may be implemented. The term "cloud" refers generally to the fact that the processes and functionalities are generally agnostic to the distribution and configuration of the underlying hardware processing resources. Some or all of the depicted system components may be considered part of the cloud. Alternatively, some or all of the depicted components may be operating behind firewalls, e.g., as part of a private network, data center, etc. Embodiments are contemplated in which components operating outside the cloud connect with components operating within the cloud using a "software-as-a-service" model. Numerous other variations by which system components may be deployed and interact will be apparent to those of skill in the art.

Embodiments of the invention are contemplated in which the described components operate on one or more servers which may be remotely accessed by and/or connected with other system components over the Internet using the Internet Protocol and related technologies. More generally, it will be understood by those of ordinary skill in the art that use of the use of a cloud in FIG. 1 implies a much wider variety of distributed computing environments that may be suitable for various implementations. As such, the present invention should not be limited by reference herein to particular computing environments, conventions, or paradigms.

For simplicity, the components of FIG. 1 may be referred to as "clients" or "servers." That is, the system components participate as "clients" or "servers" to particular flows in the sense of these terms within, for example, the REST (REpresentational State Transfer) computing paradigm, with a component making a request or query to an endpoint being a "client," and the component receiving and responding to that request or query being a "server." As will be understood by those familiar with the REST paradigm, a "server" may also be a "client" (and vice versa) within the same or different flows. Regardless of these labels, it should be understood that each component (which may represent one or more instances of the depicted component) may be implemented with one or more computing devices or resources using any of a variety of computing paradigms and computer program instructions implemented with any of a variety of programming tools and languages and stored in any of a variety of non-transitory computer-readable media. Implementations may be deployed across various portions of public and/or private networks, as well as entirely behind the firewall of a private network. Therefore, references to "clients" and "servers" should not be used to unduly limit the scope of the invention.

The system components shown in FIG. 1 operate relatively autonomously and with a well-defined set of functions that are largely non-overlapping, and share very little with other system components. The APIs of each the system components are constrained such that a component receiving a voucher can operate on that voucher without participation by other components except as specified in the API.

The Authorization Server (cAS) 102 is responsible for validating vouchers and issuing corresponding tokens. The Authorization Server may also validate specific segments of a voucher. For example, in the case of permit vouchers, i.e., vouchers tied to a single user's identity, the Authorization Server is responsible for assuring that the user making a request with a permit voucher is the user identified in the permit voucher. This may be done using any of a variety of techniques. According to a specific implementation, the OpenID standard is employed for this function. This allows for identity assurance without exposing the user's credentials (e.g., user name and password). OpenID may also be used to enable user interface access to the system and management of a corresponding account. Such an approach may be leveraged to enable connecting vouchers to the individual user currently logged in, thus enabling, for example, an audit trail.

According to another implementation, this function is implemented with the BrowserID identity protocol (recently renamed Persona) from Mozilla Corporation. This protocol represents a source of authenticated identity that may be used by the cAS to bind an identity to a permit voucher as well as for other purposes. More specifically, the protocol verifies that a given email address corresponds to a particular user. Further details regarding the BrowserID or Persona identity protocol from Mozilla may be found at www.mozilla.org.

The Lockbox Server (cLS) 104 is the repository in which a user's collection of vouchers is stored, as well as the system's primary user interface through which each user manages his collection of vouchers (e.g., with the user's own computing resources such as, for example, a laptop 106 or a smart phone 108). According to some embodiments, a cLS may be implemented as an application that runs entirely or at least partially on the user's device. Voucher management may be accomplished with any of a variety of interface and file organization mechanisms, e.g., hierarchies of folders, tags, etc. According to the depicted implementation, the Lockbox Server is configured to coordinate the activities of other system components to enable user operations such as redemption of vouchers, claiming, etc. It should be noted that embodiments are contemplated in which a cLS is not present, e.g., users may interact directly with the other system components in the manner described herein with their own computing resources. Embodiments are also contemplated in which multiple parties may be operating cLS's of various types. A cLS might be as simple as an email folder in an email system, or something more complicated like a database. A cLS might also be implemented as part of a multi-purpose application that includes other functionalities. More generally, a cLS may be associated with, or optimized for use with, one or more specific RoIP-enabled applications, or else entirely generic and application-agnostic.

The Escrow Server (cES) 110 encodes the rules governing a particular class of vouchers. In particular, and as will be discussed, the Escrow Server controls the creation and redemption of "offer vouchers." According to some implementations, the Escrow Server may also be configured to coordinate trades of goods and/or services (i.e., trades of the vouchers representing such goods and/or services) according to parameters and rules specified by anyone proposing such a trade.

The Mint Server (cMS) 112 is responsible for the creation of all vouchers other than offer vouchers and some account vouchers (i.e., account vouchers may be issued by the system component where they will be used to create voucher classes). These include vouchers that can be part of exchanges of vouchers under the control of the Escrow Server, e.g., as the consideration provided during the course of redeeming an offer voucher.

The Protected Resource Server (cPR) 114 is a repository that stores or otherwise controls access to the digital resources that are the subject of the rights expressed in vouchers, e.g., digital content, services, etc. The Protected Resource Server provides access to particular digital resources in response to presentation of a corresponding token that has been issued by the Authorization Server as part of the validation of a corresponding voucher. In some implementations, the Protected Resource Server may be implemented by and under control of the entity that owns or controls the digital resources, e.g., a content publisher or service provider. It is contemplated that, according to some embodiments, cPRs are the most numerous and diversely implemented components in the system (e.g., representing the diversity of products, services, and corresponding providers), followed by cLSs (i.e., the way in which the consumers of products and services interact with the system).

According to one class of embodiments, the Protected Resource Server is implemented as a gem (i.e., a library of Ruby code) that may be downloaded to a web server and that provides all of the code necessary to validate tokens and to turn the web server into a Protected Resource Server. The gem acts as a kind of filter or gateway that ensures that only requests accompanied by valid tokens can access the corresponding protected resources.

A Protected Resource Server can be configured to accept or "choose to trust" the tokens issued by one or more Authorization Servers. According to a specific embodiment, this is accomplished by the Protected Resource Server being in possession of a particular Authorization Server's public key and the matching digital signatures in the tokens issued by that Authorization Server.

The system components depicted in FIG. 1 interoperate in defined ways, typically operating on endpoints that are encoded in vouchers. For example, the Mint Server that creates a voucher selects the Authorization Server that will be used to validate that voucher and encodes that endpoint in the voucher.

As alluded to above, the system components in some embodiments may be implemented in accordance with at least some of the guiding principles embodied by the REST (REpresentational State Transfer) computing paradigm. The currently evolving notion of a "RESTful" system is based on the doctoral dissertion of Roy Thomas Fielding entitled *Architectural Styles and the Design of Network-based Software Architectures*, University of California, Irvine (2000), the entirety of which is incorporated herein by reference for all purposes. Although there is, as of yet, no ratified standard, a RESTful system generally observes a set of principles that define how Web standards such as HTTP and URLs may be used to facilitate heterogeneous application-to-application communication. Generally speaking, REST relates to resource-based systems in which URLs refer to the resources and HTTP "verbs," e.g., "get," "post," "put," or "delete," are used to manipulate these resources.

According to a specific class of embodiments, each system component has a specific set of responses to the HTTP verbs. That is, each component stores a set of rules for how it operates on the contents of a query for each of the different verbs. A list of HTTP verbs for each system component in a particular implementation is provided below. Some implementations employ HTTPS (the secure version of HTTP) to obscure important information from potentially malicious third parties. For additional information on RESTful systems, please refer to *A Brief Introduction to REST* posted by Stefan Tilkov on infoq.com on Dec. 10, 2007, the entirety of which is incorporated herein by reference for all purposes.

In addition, and according to some embodiments, authorization in some steps of some system flows may be achieved in accordance with at least portions of OAuth 2.0 as described in *The OAuth 2.0 Authorization Protocol*, draft-ietf-oauth-v2-28, Network Working Group, E. Hammer, Ed., dated Jun. 19, 2012, the entirety of which is incorporated herein by reference for all purposes.

Examples of flows illustrating interaction among system components according to specific embodiments of the invention will now be described with reference to the accompanying figures. The convention for these figures is that time extends down the page and components involved in the depicted flow are arranged across the top of the page. Communications between endpoints (e.g., requests or queries, and responses) are depicted as horizontal arrows with the name of the endpoint to which the communication is directed above the arrow, and a description of the communication payload below the arrow. Diamonds represent validations or other operations performed by the corresponding component.

Voucher Redemption

Figure 2:
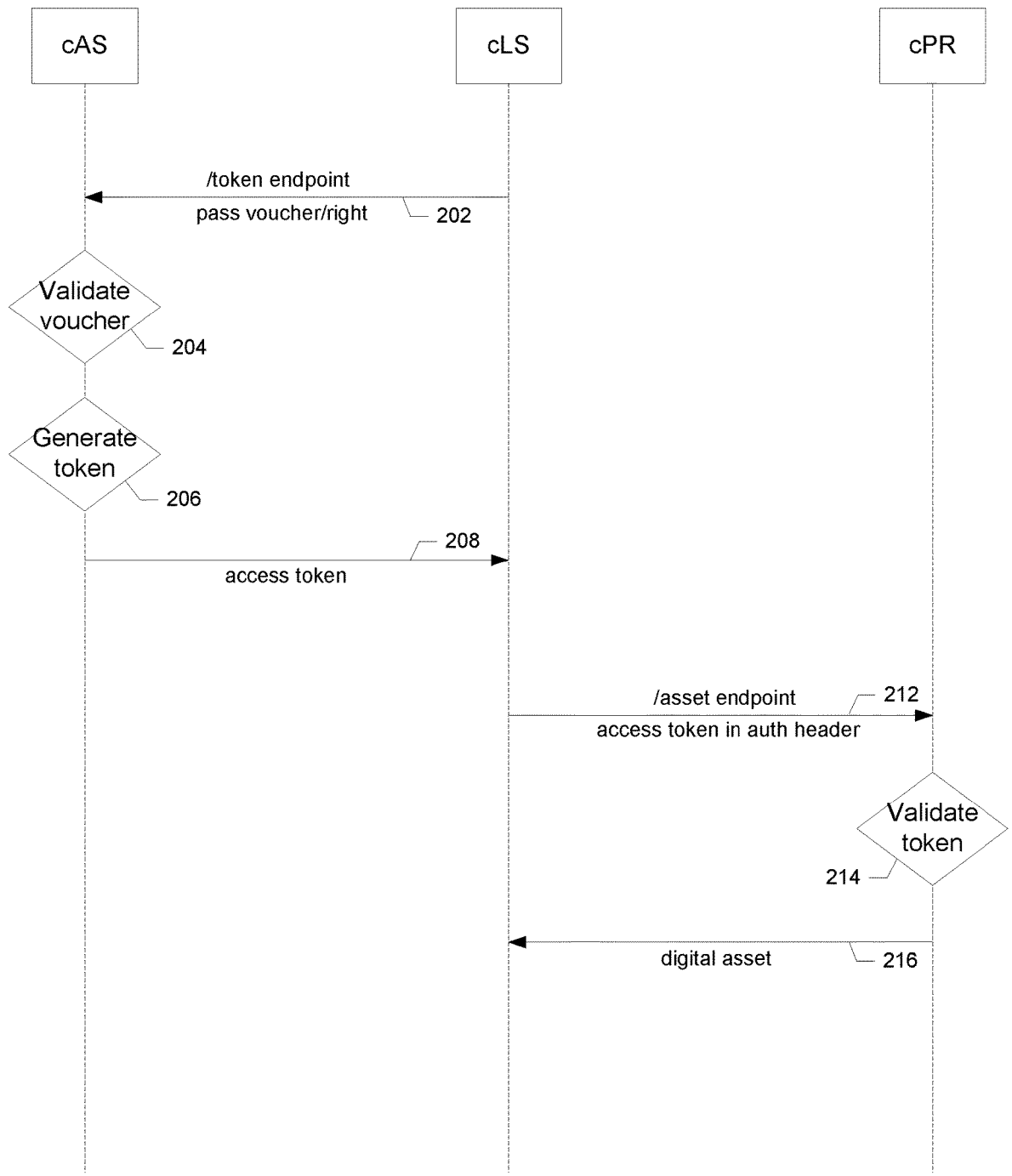
FIGS. 2 through 7 depict examples of flows illustrating interaction among system components of a rights-based system according to various embodiments.

The flow shown in FIG. 2 illustrates redemption of a right for a product or service of some kind (e.g., a digital asset) with a pass voucher. The depicted example is one of the simpler flows and relates to the use of the simplest type of voucher, i.e., a pass voucher. The way in which other flows described below handle permit vouchers and ticket vouchers is similar to how those types of vouchers are handled in the redemption scenario, and so portions of the flow of FIG. 2 that are common with those flows will not be explicitly described in the description of those flows. And more generally, common steps in different flows may be omitted and/or combined to provide emphasis on the more relevant steps for the corresponding description. Moreover, a wide variety of specific use cases and combinations not explicitly enumerated and described herein may be readily inferred by those of skill in the art from the descriptions of the flows presented herein.

The flow of FIG. 2 involves three components, i.e., an Authorization Server (cAS), a Lockbox Server (cLS), and a Protected Resource Server (cPR). As the depicted flow involves redemption of an existing pass voucher that is not an offer voucher, participation of a Mint Server (cMS) or an Escrow Server (cES) is not required. Initially, a user selects one of his vouchers, e.g., a voucher representing the right to access a picture, in a user interface provided by the cLS. From the user's perspective, this may involve selecting a link or a visual representation of the picture (e.g., a thumbnail) in the interface as is done with conventional techniques.

In response to the selection of the pass voucher, the cLS identifies the selected voucher as a pass voucher for a product with no parameter template (discussed below) and that determines what flow will govern the operation. The cLS needs to request a token for presentation to the cPR which is not configured to process vouchers. That is, the cPR requires a valid token as proof that access to the resource should be authorized. To obtain the necessary token, the cLS makes a request (202) to the corresponding token endpoint of the cAS and provides the selected pass voucher as the payload of the request, identifying which one of potentially multiple rights encoded by the voucher is to be redeemed.

The cAS needs to validate the pass voucher before it can issue the requested token. According to a specific embodiment, the cAS validates the voucher (204) by checking the signature of the voucher. An additional signature check may also be included that ensures that the voucher was not forged by an unauthorized component, e.g., the public key of the component that issued the voucher.

According to a specific implementation, signature comparison is accomplished using a Ruby gem called lorax which solves the problem of comparing blocks of xml to ensure semantic consistency even where the blocks may differ in other respects that don't affect meaning, e.g., different amounts of white space, different order of attributes, etc. This is important because, as vouchers get moved in and out of databases, the XML representations can change in minor respects without affecting their semantic characteristics. For more information regarding lorax, please refer to *Change management of semi-structured data on the Web*, Gregory Cobena, Ecole Doctorale de l'Ecole Polytechnique (2003), the entirety of which is incorporated herein by reference for all purposes.

According to another implementation, in which tokens and vouchers are encoded using JavaScript Object Notation (JSON), signing a voucher (e.g., an unordered grouping of key-value pairs expressed as a JSON-encoded string) is accomplished by removing any whitespace (outside of encoded values), lexographically sorting the various keys within the keys/values list, removing the "refresh" and "signature" keys and associated values, and performing a Digital Signature Algorithm signing operation on a cryptographically secure hash of the resulting JSON-encoded string. The Base64-encoded result of the signing operation is added as the value of the "signature" key of the voucher, and used as the basis for future validation of the voucher, required for issuance of a token by the Authorization Server (cAS). Signature validation assures that no unauthorized alterations were made to the voucher between signing and token issuance, similar to the lorax-based signatures used for XML-formatted vouchers.

In the example of FIG. 2, the cAS does not need to authenticate the user requesting access to the protected resource because the voucher is a pass voucher which may be used by anyone. Neither does the cAS need to know anything about the cPR. Rather, in this simple case, the cAS simply needs to validate the voucher, in response to which, it generates a token (206) corresponding to the specified right (signed by the cAS using the Digital Signature Standard (DSS) and sends it back to the cLS as a payload (208).

According to a specific implementation, the cAS flow for validating vouchers in response to a request for an access token includes 1) for permits, access code validation; 2) for permits, tickets, and passes, voucher signature validation; 3) for permits, tickets, and passes, namespace validation; and 4) for tickets and permits, refresh validation. The order of these operations may vary. It should also be noted that these steps (in whatever order) must all be performed for the relevant vouchers, e.g., the processing a permit voucher is not complete simply because the access code is validated.

According to a specific implementation, the token is a JavaScript Object Notation (JSON) object that is only valid for one endpoint on the cPR and only for a specified period of time, e.g., 10 minutes. The token includes a pair of key values named according to or at least in partial compliance with the OAuth standard. That is, the token employed by this embodiment inherits the attributes of a conventional OAuth token with some additional attributes.

The cLS receiving the token embeds the token in the authorization header of an HTTP query, e.g., an HTTP "get," to the cPR that has the corresponding digital asset, and transmits the HTTP query to the asset endpoint on the cPR (212). The cPR validates the token (214) by checking the signature and determining whether the scope, i.e., the key for the value of the requested digital asset, is equivalent to the endpoint to which the query is directed. Once the token is validated, the cPR returns the corresponding digital asset to the cLS (216) which, in turn, presents the digital asset to the user who requested it.

According to various implementations, a cPR can interpret the scope or any other aspect of a token. For example, the scope can be interpreted as requiring an exact match for the incoming query for a protected resource, as validating access to any resource under the root of a tree denoted by the token's scope, or using any other policy chosen by the resource owner operating the specific cPR.

Figure 3:
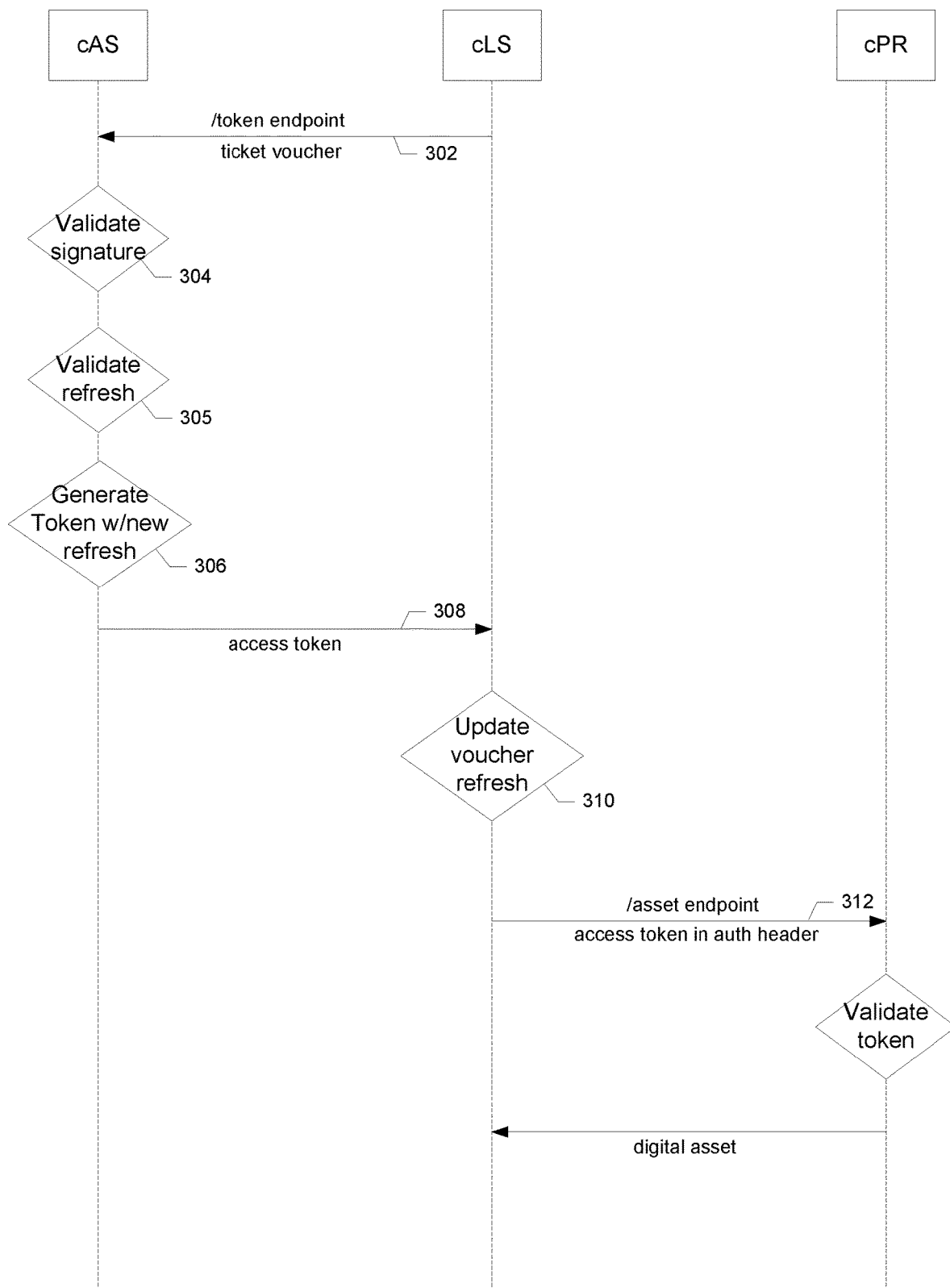

The flow shown in FIG. 3 illustrates redemption of a right for a digital asset with a ticket voucher, i.e., a voucher that can be redeemed by only one holder, but where the identity of the holder is unrestricted. As with the flow of FIG. 2, no namespace or parameter template is involved in this example. Unlike a pass voucher, a ticket voucher requires a "refresh," i.e., a mechanism that makes the ticket voucher a digital bearer instrument. As used herein, the term "digital bearer instrument" refers to a digital object the possession of which is sufficient to validate its redemption. "Possession" in the case of a pass voucher means simply having an unmodified copy of the voucher. For ticket vouchers, possession means having an unmodified copy of the voucher containing the most current refresh value. For permit vouchers, possession is the same as for ticket vouchers, except the holder must also supply credentials identifying himself as the entity corresponding to the user_identity of the permit voucher. Generally speaking, a refresh value is not signed component of a voucher because, as discussed below, it needs to be able to be modified unlike a signature which needs to remain constant. Because the refresh value is an opaque value that cannot be guessed the strength of the system is not compromised by this design decision.

The use of a refresh to give the ticket voucher its bearer character is reflected by additions to the flow of FIG. 2 as illustrated in FIG. 3. As shown, in response to the initial token query from the cLS (302), and in addition to the voucher validation steps described above (304), the cAS also validates the voucher by checking the refresh value encoded in the voucher (305) which must match the most recent refresh value stored by the cAS. That is, when the cMS issues a ticket (or permit) voucher, it requests an initial refresh value from the cAS which it encodes in the voucher, and which is stored by the cAS. Each time the voucher is subsequently involved in a claim or redemption flow, a new refresh value is generated by the cAS which is inserted into the voucher and stored by the cAS. According to a particular implementation, each time a new refresh value is assigned by the cAS to a voucher, a sequence number embedded in the refresh value is incremented, and can be used by the cLS or any other component to assist in identifying the most recently generated refresh value. This optional feature is useful for ordering multiple copies of the same voucher having different refresh values.

According to a specific implementation, the refresh value (which makes ticket and permit vouchers digital bearer instruments) represents a pseudo-randomly generated number. As will be understood, any of a wide variety of suitable algorithms exist that could be used for this purposes that generate values that are cryptographically valid and computationally infeasible to determine. Often such algorithms are provided within the operating system of the computing resource(s) on which the cAS operates. One example of such an algorithm that is suitable for use with embodiments of the invention is the random number generator in the Open SSL Linux library.

If the refresh value in the voucher matches the refresh value held by the cAS, the cAS generates a token with a new refresh value (306) (which the cAS stores), and sends the token back to the cLS (308). The cLS updates its copy of the voucher with the new refresh value (310) (otherwise it would no longer be usable), embeds it in the authorization header of an HTTP query and sends the token to the cPR endpoint (312) as described above to request the digital asset.

Figure 4:
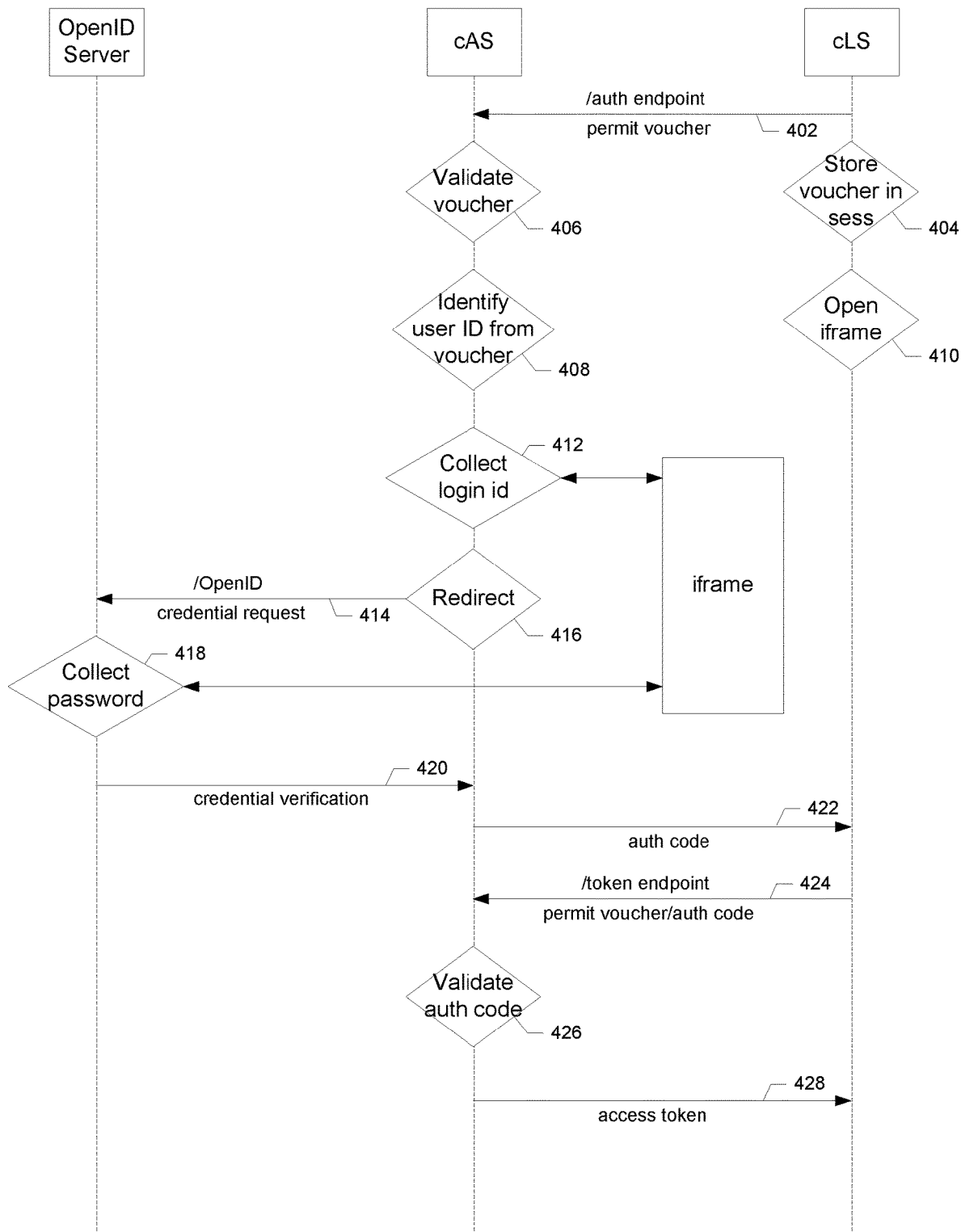

The flow shown in FIG. 4 illustrates redemption of a right for a digital asset with a permit voucher, i.e., a voucher that can be redeemed by only one holder with a specific identity. As with the flows of FIGS. 2 and 3, no namespace or parameter template is involved.

The flow depicted in FIG. 4 is one of the more complicated flows, involving browser redirection and the use of an iframe. In addition, the flow includes another system component which, in the depicted implementation, is an OpenID server responsible for facilitating user authentication. As will be understood, any suitable user authentication mechanism could be used. It should also be noted that, for the sake of simplicity, the portion of the flow following the cAS providing the access token to the cLS (e.g., see FIGS. 2 and 3) is not depicted.

When the cLS determines that the voucher selected by the user is a permit voucher, it generates a request to an authorization endpoint on the cAS for an authorization code (e.g., in accordance with OAuth 2.0) and transmits the request to the cAS with the permit voucher as the payload (402), and stores the voucher in session (404). The cAS validates the voucher (406), retrieves the user identity information from the voucher (408). Meanwhile, the cLS opens an iframe in the user's browser (410). The cAS puts up a login screen in the iframe in which the user is prompted to enter his claimed identity information (but not his password) (412), and then, assuming the identity information entered in the login matches the identity information encoded in the voucher, requests credential verification from the OpenID server (414), and redirects the user's browser to the OpenID server corresponding to the identity information encoded in the voucher (416).

The OpenID server then puts up a password collection screen in the iframe open in the user's browser in which the user is prompted to enter his password (thus keeping the password out of the hands of the system's other components) (418). According to a specific embodiment in which the browser's address bar does not indicate the URL of the OpenID server that a sophisticated user might expect (i.e., because the connection is established with an iframe), additional verification information may be presented (either in the iframe itself or in the browser's address bar) to reassure the user that they are securely interacting with the correct OpenID server as expected.

In the initial credential collection query to the cAS, the cLS also provides a redirect URL to the cAS that specifies a callback URL on the cLS for a second level of redirect. Assuming the user enters the correct password, the OpenID server returns a response to the request from the cAS (420) with information associated with the correct credential collection. When the cAS is assured that the OpenID server responded correctly, it provides an authorization code to the callback URL on the cLS (422). In the depicted embodiment, these communications between the cLS and cAS are at least partially OAuth 2.0 compliant, while the communication between the cAS and the OpenID server are compliant with the OpenID protocol. That is, the cLS views the cAS as an authority for identity information, but the cAS, in turn, needs the OpenID server as its authority for identity information.

The authorization code enables the cLS to then make a token request (which includes both the authorization code and the voucher) to the cAS (424) which validates the presented authorization code against its stored copy of the authorization code (also referred to as a "verifier" in the lexicon of OAuth 2.0) (426) and issues the token to the cLS (428). The cLS may then request the digital asset from the cPR as discussed above. As will be appreciated, in this example, signature and refresh validation/updating are omitted for the sake of clarity.

According to a particular implementation that employs the BrowserID identity protocol instead of OpenID to authenticate the user of a permit, the assertion issued by BrowserID for the purpose of logging into the cLS is stored by the cLS with a programmable lifespan (e.g, an hour), and may be sent to the cAS which checks back with BrowserID to validate the assertion. If the assertion is still valid, e.g., still within its lifetime, the cAS can use it for authentication of the user without having to prompt the user for an additional log in. On the other hand, if the assertion is no longer valid, the cAS may request that the user log in.

Voucher Issuance

According to various embodiments, the hierarchy of vouchers issued by a cMS includes a master voucher that contains the right to issue account vouchers; account vouchers that contain the right to issue issue vouchers; issue vouchers that contain the right to issue final product vouchers; and final product vouchers that may be redeemed for digital assets. The hierarchy of vouchers issued by a cES includes a master voucher that contains the right to issue account vouchers; account vouchers that contain the right to issue offer vouchers; and offer vouchers. The hierarchy of vouchers issued by a cAS includes a master voucher that contains the right to issue account vouchers; account vouchers that contain the right to register namespaces; and namespace vouchers that contain the right to de-register the corresponding namespace (e.g., using the "delete" HTTP method).

Figure 5:
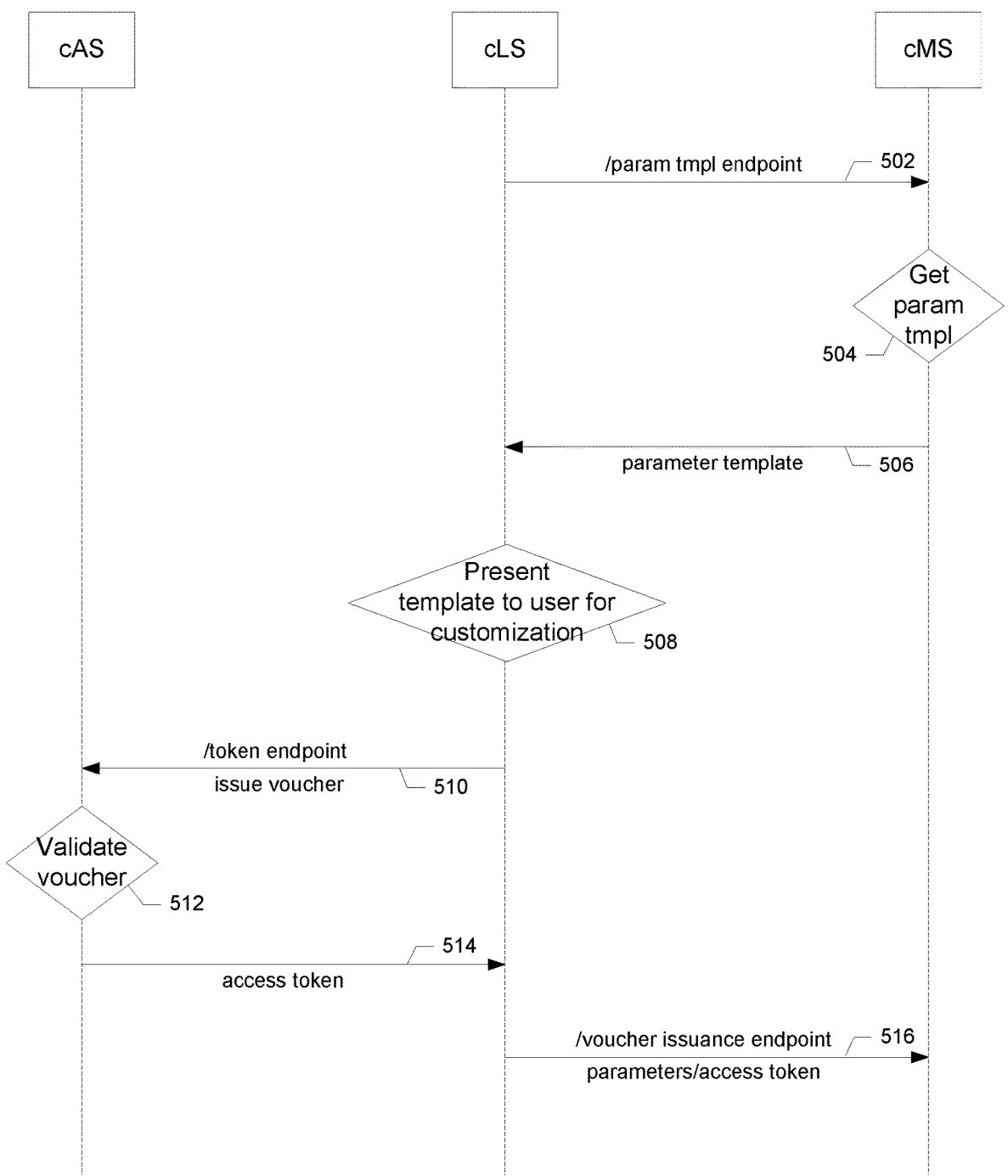

According to a particular class of embodiments, issuance of a voucher involves a parameter template. FIG. 5 is an illustration of a flow for the issuance of a voucher for a product which assumes the user interacting with the cLS is in possession of an issue voucher. As shown, this flow involves the cMS which, in this example, plays a role similar to the cPR in that the voucher issuance endpoint can be thought of as a protected resource to which an issue voucher provides access. The flow begins like a redemption flow in that the user wishing to issue the voucher selects his issue voucher in the interface provided by the cLS. And the depicted flow is a two-part flow in which the cLS first obtains a parameter template with which the user can specify certain variable characteristics of the final product voucher, followed by the issuance of the product voucher itself using the completed template.

In response to selection of the issue voucher by the user, the cLS generates and transmits a request to the voucher issuance endpoint on the cMS for the corresponding template (502). The cMS looks up the issuance endpoint to which the request is directed (stored as part of the issuance of the issue voucher) and retrieves the parameter template (504) and transmits it back to the cLS (506). The issuance endpoint corresponds to a "class" of vouchers the endpoint is responsible for issuing.

According to some embodiments, the cMS endpoints to which the request for the parameter template and the request for the final product voucher are directed may have different URLs. According to others, they may be one and the same. In one such embodiment, different HTTP requests are used to distinguish between the two operations, e.g., a "get" may be used to obtain the parameter template and a "post" may be used to obtain the final product voucher. Thus, a post request to a cMS issuance endpoint in this flow contains parameters provided as part of a parameter template. The point of the request for the parameter template is to obtain the fixed and variable parameters required to redeem the right to access the issuance endpoint and proceed with issuance of the voucher.

Parameter templates may also be used by a cPR to constrain access to protected resources during product redemption. For example, a cPR may optionally provide fixed and/or variable parameters in a parameter template at an endpoint on the cPR which may be the same as or different from the redemption endpoint, and then require that those parameters appear in any redemption requests directed to that endpoint.

Returning to FIG. 5, the cLS presents the parameter template received from the cMS to the user (508) in any suitable format that will allow the user to view the template and/or to fill in any variable values for customization of the voucher to be issued in anticipation of a subsequent request to the cMS for issuance of the voucher itself. According to a specific embodiment, variables are encoded in the parameter template using "mustaches" which come from a Ruby gem called "mustache" which presents variables for interpolation using double "squiggle" brackets. When the cLS encounters a mustache in the returned parameter template, the user is presented with a suitable input field (e.g., a text field, drop down menu, etc.) in which a corresponding variable value may be entered. Thus, different looking product vouchers may be issued from the same class of issue voucher.

Once the user has filled in any variables (or has simply reviewed the template in the case where the template contains no mustaches), the user can choose to submit the template, in response to which the cLS generates and transmits a request to the cAS (510) for a token for accessing the cMS issuance endpoint from which the voucher is to be generated. As with a redemption flow discussed above, the cAS receives the request, validates the voucher (512), and transmits the token back to the cLS (514).

After receiving the access token from the cAS, the cLS generates a final redemption request for issuance of the product voucher using the parameter template (516). The request is directed to the URL of the issuance endpoint on the cMS with a payload of the parameter template and the access token originally requested by the cLS for the issuance endpoint on the cMS. The cMS then uses the parameter template (including any variable values specified by the user) to generate the final product voucher which it then transmits to the requesting cLS.

As will be discussed, the issuance of offer vouchers by the cES and the registration of namespaces by the cAS employ similar flows, although it should be noted that the cMS flow may include the step of issuing an issue voucher which is not needed by the other two components in that they only have a single class for namespace and offer issuance.

Figure 6:
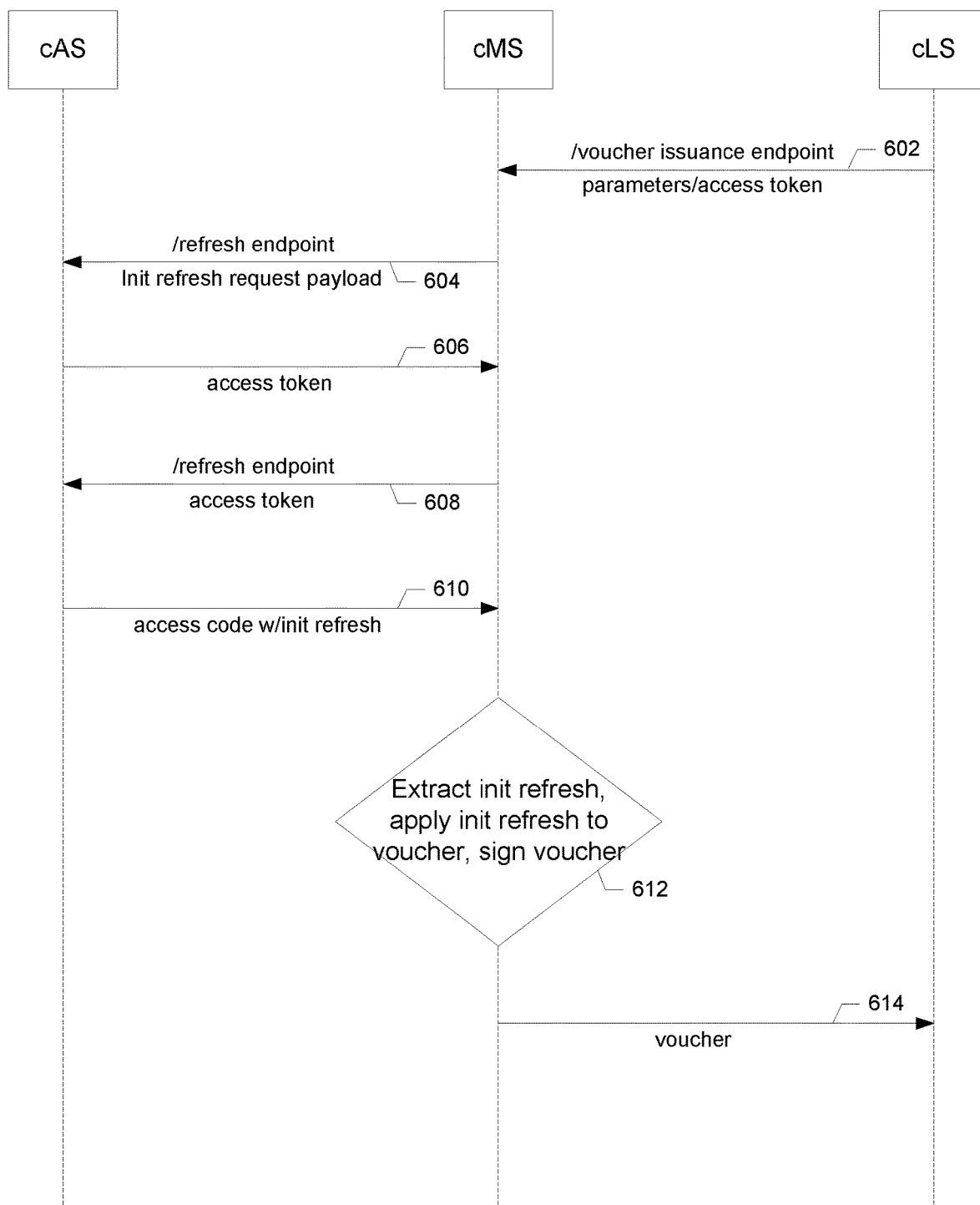

FIG. 6 illustrates an example of a flow by which a cMS issues vouchers in response to a final redemption request from the cLS. Such a flow can result in pass, ticket, or permit vouchers although, unlike the refresh values for ticket and permit vouchers, the refresh value for a pass voucher does not change over its life.

In the depicted example, the cLS generates a request for issuance of a voucher and includes a parameter template and an access token (602), e.g., the final redemption request of FIG. 5. The cMS then generates a request directed to the refresh endpoint on the cAS for a token (604, 606) which the cMS then uses to request the initial refresh value for the voucher being issued (608). The refresh endpoint on the cAS is a highly protected resource in that it is the updating refresh value that enables the redemption of rights in the system. According to one class of embodiments, the cMS stores a ticket or permit voucher that allows it access to the refresh endpoint on the cAS. According to other embodiments, trust can be established between the cMS and the cAS for this purpose using any of a wide variety of mechanisms including, for example, OAuth 2.0 or an OAuth compliant protocol.

In response to the request from the cMS, the cAS refresh endpoint responds with an access code containing the initial refresh value (610). The cMS extracts the initial refresh value from the received access token, discards the remainder of the token, applies the initial refresh value to the voucher being issued, signs the voucher (612), and then transmits the voucher to the cLS to be stored in the repository of the issuer that requested it (614).

Offer Voucher Issuance

Figure 7:
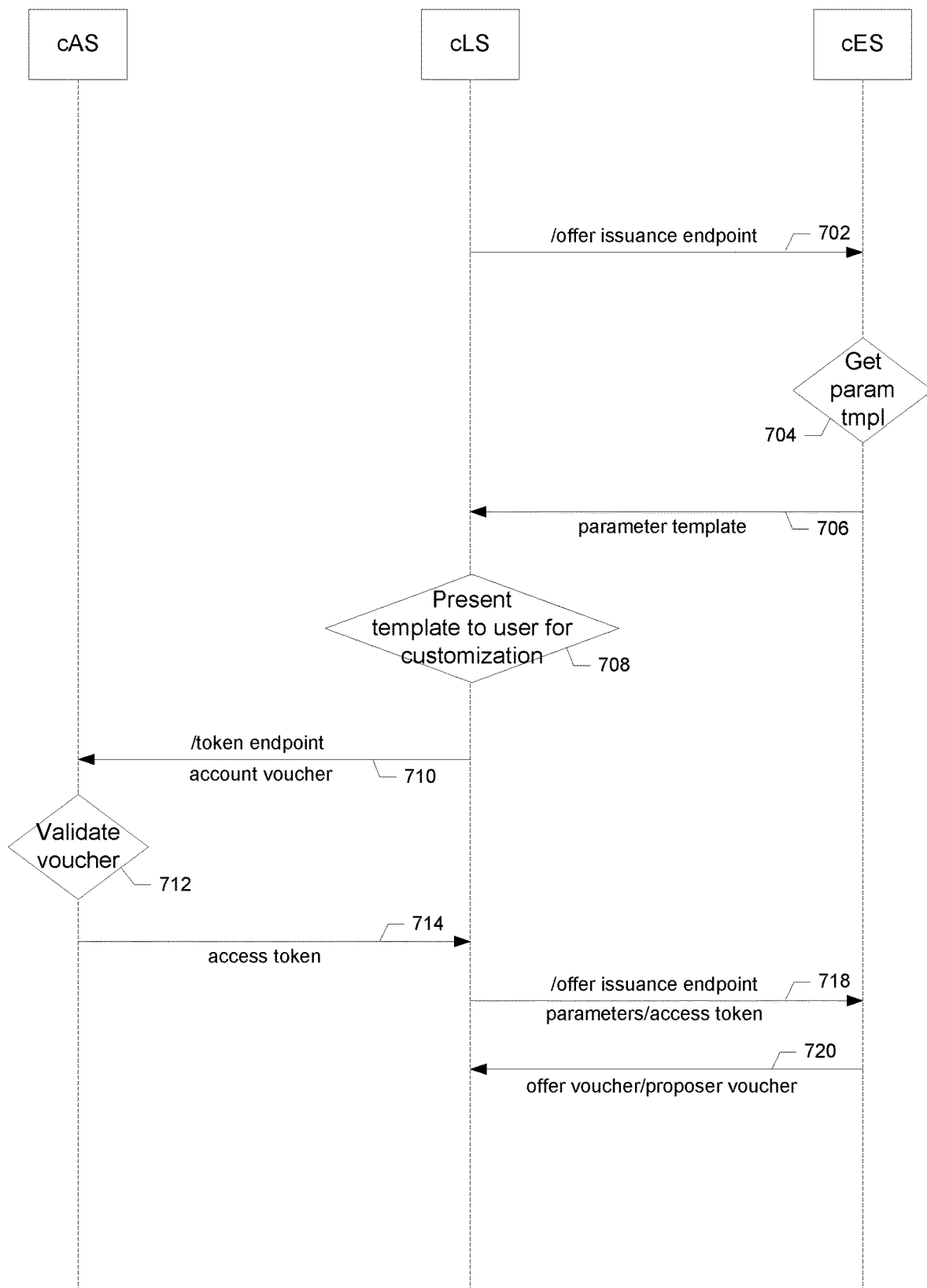

FIG. 7 illustrates an example of a flow by which a cES issues offer vouchers. The term "offer" is used to refer to the terms of an offer as stored on the cES. The term "offer voucher" is used to refer to the voucher object that a holder can present to actually redeem the offer. As mentioned above, this flow is very similar to FIGS. 5 and 6 by which the cMS issues other types of vouchers.

The holder of an offer voucher that has been issued has, by definition, the right to accept the offer as specified in the offer voucher. The issuer of an offer voucher, also referred to as a "proposer," not only gets back the offer voucher he requested be issued, but also a proposer voucher which includes rights such as, for example, the right to cancel the offer (so the offer is no longer available for acceptance even by people that hold the offer voucher), the right to un-cancel the offer (i.e., to reinstate a previously canceled or expired offer), and the right to collect the consideration provided by acceptors of the offer that accumulate in a corresponding repository in the cES. According to various embodiments, upon acceptance each offer can receive zero or more consideration vouchers, and provide one or more benefit vouchers. All consideration vouchers provided in connection with all acceptance occurrences are returned to the offer proposer in a collection step.

According to various embodiments, offer vouchers can be any type of voucher (pass, ticket, or permit) with the example illustrated in FIG. 7 being the issuance of an offer voucher that is a pass voucher for simplicity. The differences in the flow for ticket and permit type offer vouchers will be understood by those of skill in the art by referring to the previous flows discussed above.

According to a particular implementation, the offer issuance voucher is an account voucher that includes the right to issue offer vouchers on the cES, i.e., a right to access the corresponding single endpoint on the cES. More generally, an account voucher (which is under a particular account as discussed below) includes an issue right that allows the holder to create vouchers on a corresponding one of the system components capable of issuing vouchers, i.e., the cMS, cES, or cAS.

The offer proposer has a voucher (e.g., an account voucher) that contains the right to issue an offer voucher, i.e., a right which is analogous to, but distinct from, the right in an issue voucher. The proposer, interacting with the cLS, initiates the offer issuance flow, in response to which the the cLS generates and transmits a request for a parameter template (e.g., an HTTP "get") directed to the endpoint on the cES corresponding to the right to issue an offer (702). Unlike the multiple issuance endpoints for vouchers issued by the cMS for different classes of issue vouchers, the endpoint on the cES for issuing offers is a single endpoint, i.e., there are not multiple classes of offer vouchers like there can be for vouchers issued by the cMS.

The cES returns the requested parameter template to the cLS (704, 706). In response to completion of the parameter template on the cLS by the proposer (e.g., filling in the offer terms, benefits, consideration, etc., in the template mustaches) (708), the cLS generates a redemption request to the cAS for an access token to the same cES endpoint from which the parameter template was received (710). The cAS receives the request for the token, validates the voucher in the payload (712) (e.g., as discussed above), and returns the requested token to the cLS (714). It should be understood at this point that if the voucher sent to the cAS is a ticket or permit voucher (e.g., an account voucher is typically a permit voucher), all of the steps described above relating to redeeming ticket or permit vouchers would be required. These steps are not shown in FIG. 7 for the sake of simplicity.

The cLS receives the token from the cAS (716), and generates a request for the offer voucher (e.g., an HTTP "put") to the cES offer issuance endpoint with the token and the completed parameter template as the payload (718). The cES responds with both the offer voucher and the proposer voucher which are stored in the proposer's repository on the cLS (720).

According to a specific class of embodiments, the user interface presented to the offer proposer interacting with the parameter template on the cLS includes selectable options corresponding to the types of vouchers that are appropriate for use as benefits and considerations. This is important for such embodiments in that a benefit is a voucher issued by the cES at the time of acceptance of an offer by a user. To enable this, the proposer also supplies to the cES a benefit issue voucher (BIV) in the payload of the request for issuance of the offer voucher. The BIV, in turn, refers to a voucher issuance endpoint on the cMS for which the corresponding parameter template contains no mustaches, i.e., the cMS does not have the intelligence to fill in variables. Therefore, according to such embodiments, before issuing the offer voucher, the cES verifies that the parameter template on the cMS corresponding to the BIV does not include mustaches.

According to a specific embodiment, the BIV could be implemented to enable limited offers. For example, the BIV could specify that only a specific number of benefit vouchers are to be issued, or could be implemented to expire after a certain period of time or at a specific point in time. Alternatively, the proposer could monitor the number of acceptances or the passage of time and use his proposer voucher to terminate the offer at his discretion.

The consideration required to effect acceptance of an offer represented by an offer voucher is specified by the proposer (e.g., by selecting a parameter template option) as an endpoint on the cMS from which vouchers that are acceptable consideration are issued, i.e., all vouchers of a particular class of vouchers corresponding to the specified cMS endpoint. Thus, the range of acceptable consideration for accepting an offer is determined by the size or generality of the class of vouchers that may be issued by the specified cMS endpoint. For example, if the parameter template corresponding to the issuance endpoint on the cMS is highly variable (e.g., contains many mustaches), the range of consideration suitable for responding to an offer specifying that endpoint is correspondingly large.

According to a particular implementation, the cES receives the request to issue the offer voucher from the cLS, and stores and "claims" the BIV. As used herein, the claiming of a voucher refers to a "claim right" included in each ticket voucher and each permit voucher which is not specified by the original issuer but is, instead, generated dynamically by the cMS. The claim right in a ticket or permit voucher allows any holder of a copy of the voucher (including, for example, the cES) to "claim" the voucher by requesting a new refresh value for the voucher from the corresponding endpoint on the cAS. Exercise of the claim right effectively takes away the right of any other holder of a copy of the voucher to redeem the voucher because the copies held by anyone else do not contain the current refresh value. For ticket vouchers, the claim right allows one holder to terminate another holder's ability to redeem the ticket voucher in favor of his own.

The claim right may even be exercised for a permit by user that is not the user identified by the permit voucher as the user entitled to redeem the other rights represented by the permit voucher. That is, even though a user holding a permit voucher might not be entitled to redeem the primary rights of the permit voucher (because he does not correspond to the identity specified in the permit voucher), he can prevent the user corresponding to that identity from redeeming the permit voucher by exercising the claim right and updating the refresh value in the cAS and in his copy of the permit voucher. In such a case, neither of the users could redeem the permit voucher.

To understand the value of the claim right, it should be noted that vouchers can be viewed much like currency, i.e., when someone steals a dollar bill from someone else, for better or worse, the thief get to use the stolen currency. Thus, the security of the dollar is up to its owner to assure. In the context of a system designed as described herein, the claim right enables the completion of any transfer process in which a first user intentionally gives a second user a ticket voucher. This makes sense in that, for many types of underlying assets, the second user would want assurance that first user was no longer able to use the transferred voucher. Otherwise the meaning of "transfer" relative to a ticket voucher would be very weak. By contrast, because pass vouchers are freely copyable, and any number of copies are usable, no claim right is required.

For permit vouchers, the ability to claim one for which the claimant had no identity credentials would allow the claimant to safely store the permit voucher on behalf of whoever does have the user identity credentials specified in the voucher, i.e., the owner. This would be "safe" from the point of view of the owner of the permit voucher who would know that, although his voucher had been claimed by the storing entity, it could still only be redeemed by the legitimate owner after he had reclaimed it. That is, when the claimant gives the permit voucher back to its owner, the owner can then claim it back. The claim right therefore enables escrows.

According to some implementations, claim rights are not necessary and are therefore not appended to vouchers when they are issued. That is, because claims represent the first half of a redemption, i.e., the process of requesting and receiving a new refresh value, such implementations instead simply execute the first half of the redemption by obtaining the token but not redeeming it. Thus, claim rights are not needed.

Referring once again to the offer issuance illustrated in FIG. 7, when the cES exercises the claim right in the BIV received from the proposer, the cES rather than the proposer now has the right to issue benefit vouchers with that BIV. If the proposer claims the BIV after offer issuance, the offer will become disabled because the BIV is longer redeemable by the cES, and therefore benefit vouchers cannot be issued and the offer/acceptance process cannot proceed.

Each offer voucher created by the cES specifies an acceptance endpoint on the cES. The corresponding proposer voucher specifies a cancellation endpoint, an un-cancellation endpoint, and a collection endpoint. The acceptance endpoint in the offer voucher has information about the consideration(s) and benefit(s) used for validating acceptance of the offer (e.g., as originally specified in the parameter template by the proposer during offer issuance).

To accept an offer represented by an offer voucher the user in possession of the offer voucher initiates the redemption flow in a manner similar to the redemption flows described above, e.g., see FIGS. 2, 3, and 4, with the cES being in the role of the cPR. According to a specific implementation, of the possibly multiple rights present in an offer voucher, there is a single right to accept the offer. This right permits post access to the unique endpoint of the offer as exposed by the cES. The user also selects a voucher in the user interface of the cLS that is of the class specified by the offer voucher as acceptable consideration (except in the case where no consideration is required), and the cLS sends the token received from the cAS and the voucher(s) selected by the user representing the required consideration to the corresponding acceptance endpoint on the cES. Assuming the token and consideration are valid, the cES issues a benefit voucher to the user using the BIV (e.g., see voucher issuance examples in FIGS. 5 and 6).

Accounts and Namespaces

"Accounts" and "namespaces" are both mechanisms for restricting the ability to issue or redeem vouchers. They also allow the system to control and monitor the flows by which product or offer vouchers are redeemed.

According to various embodiments, an account is not manifested in the system in a conventional manner That is, information about an account is not separately stored in the system, but instead exists as an abstract concept that is encoded in the URL of a right. For example, if a user has an account called "David," this means that the user has a voucher that contains a right to operate on a cluster or a tree of objects under the David account on the system, but the system does not separately store the fact that the user and the account are connected. Instead, an account is a segment of a URL corresponding to a system endpoint, e.g., on a cMS, cES, or cPR. According to a specific implementation, the account is the first of a series of user-controllable segments of such a URL. For example, in the URL "https://cpr.company.com/roip/sony/songs/(resource name)," the segment "sony/songs" is specified by the issuer, with "sony" identifying the account. And in this example, the segment "songs" is the final component (or sub-account) of the account in which the named resource can be said to reside. The segment "(resource name)" is a resource identifier chosen by the creator of the voucher class (on the cMS), the offer proposer (on the cES), the namespace registrant (on the cAS), or the protected resource owner (on the cPR).

A master voucher contains the right to issue vouchers with no account identified. As such, the owner of a master voucher can issue vouchers under any account. However, the primary intended use of a master voucher is to issue account vouchers. Obviously, master vouchers would typically only be held by highly trusted entities, e.g., a company operating a cAS.

An account voucher typically contains rights to access endpoints on a corresponding system component capable of issuing vouchers, e.g., a cAS, a cMS, or a cES. As discussed above, a cMS maintains templates that can be redeemed resulting in the issuance of vouchers. Similarly, a cES operates on offers that have been created and stored to effect acceptance by redeemers. As will be discussed, a cAS operates on namespaces. All system components use accounts in the same way to effect these core operations.

An account voucher includes the right to issue vouchers on a corresponding one of the system components capable of issuing vouchers (i.e., a cMS, a cES, or a cAS) but only under the corresponding account. The flows corresponding to these rights embed the account in the URLs specified in these vouchers. That is, the holder of an account voucher can only create system endpoints that specify the corresponding account. Thus, the restriction represented by the account propagates through to vouchers created under the rights represented by the account voucher, e.g., to issue vouchers and offer vouchers.

Sub-accounts may also be issued underneath the account specified in an account voucher, i.e., the account holder is functionally restricted to issuing resources or sub-accounts underneath the account he holds. Such new resources and sub-accounts may be issued using an HTTP "put" directed to the URL of the account with a string including the string corresponding to the main account concatenated with one or more additional strings (separated by slashes) corresponding to the desired sub-account or resoure. In response, the component to which the request was sent issues a new account voucher for the sub-account with functionality similar to the original account voucher but only under the portion of the main account tree corresponding to the newly created sub-account. This allows the holder of an account voucher to build a tree of sub-accounts of arbitrary breadth and depth under the main account without ever separately storing information for each. This might be useful, for example, where a content provider intends to distribute different types of content through different parts of its organization. That is, account vouchers for different subaccounts can effectively mirror the real-world organizational structure of the content provider's organization to enable such functionality.

Product vouchers (vouchers containing rights to resources on cPRs other than cAS, cES, cLS, or cMS components) issued using an issue voucher may or may not specify an account, and the account specified may be different than the account specified in the issue voucher. That is, a mustache may be included in the parameter template associated with a particular issue voucher that allows the issuer to specify any or no account. Such a capability might be useful where, for example, a cPR doesn't care about accounts, e.g., a cPR that stores protected resources from multiple content publishers. It also allows for the specification of an arbitrarily deep hierarchy of folders on the cPR under which protected resources may be organized.

A namespace is the top of a DNS tree under which all DNS subdomain names may be said to belong to the same parent namespace. For example, if the namespace "company.com" is registered, then cPRs with hostnames of www.company.com, assets.company.com, and songs.assets.company.com are all considered part of the company.com namespace. When providing a token for a protected resource, the cAS compares the account in the presented voucher with namespace of the right for which it is providing the token and, if the namespace is registered to a different account, the cAS refuses to provide the requested token. On the other hand, if the namespace is either registered to that account (or one of its sub-accounts) or unregistered, the cAS provides the token.

A server controlled by a cPR operator operates within a DNS tree having a corresponding namespace. The cPR trusts the cAS with which the namespace is registered not to allow the issuance of initial refresh values for vouchers containing rights under namespaces registered under different accounts than the requester of the initial refresh value, nor to issue tokens containing rights within namespaces registered to accounts other than that of the issuer of the voucher used to obtain the token. The URL of the cPR is itself the endpoint of the right being redeemed, so cPR operators who register their cPRs' DNS trees as namespaces can be sure that only the vouchers they themselves issue can result in access to those cPRs via tokens.

A cAS stores a namespace associated with a registering account, as a result of which, only the account associated with that namespace can issue vouchers under that namespace, and no other account can reserve that namespace from that point on.

Namespaces allow the operators of protected resource servers to ensure that tokens will not be issued (thereby denying service) for vouchers containing rights to URLs within the operator's DNS namespace(s), except if the voucher was issued under the same account that registered the namespace—typically the same organization that operates the Protected Resource Servers. Namespaces allow a highly distributed system to collaborate to enforce a DNS-based security policy.

Anatomy of a Voucher

An instantiation of a representative voucher in JSON format is shown below.

```
{
"rights": [
{
"endpoint_uri": "http://uwd.locateinc.com:3005/asset/06fbae50-8733-012d-bc57-40400eea210e",
"name:": "Winter Scene Right",
"created_at": "2011-06-30T22:55:22Z",
"updated_at": "2011-06-30T22:55:22Z",
"description": "Beautiful Winter Scene"
}
],
"name": "Winter Scene Photo",
"description": "Winter Scene Photo",
"category": "PRODUCT",
"asset_type": "Still Images",
"created_at":"2011-06-30T22:55:22Z",
"updated_at": "2011-06-30T22:55:22Z",
"uuid": "f56dc570-8599-012e-1456-40400eea210e",
"signature": "MC4CFQCN1NZr1oG9q-V3LpxGfMTpFZw63AIVAIXqXOIWJfVMGsqFt2StfAGqP6Wb"
"issue_endpoint": "http://roipdev-1.dev:3000/cMS-Test1/Winter-Scene-Pass",
"auth_endpoint": "http://roipdev-1.dev:3001/roip/token",
"v_type": "PASS"
}
```

An XML instantiation of a representative voucher is shown below. This is a canonical format that a voucher might take, in which multiple rights may be represented as multiple independent <Link> entities within the XML representation. However, regardless of this depiction, it should be understood that a voucher may exist independent of its XML or JSON instantiation in any of a wide variety of forms such as, for example, a record in a database. As discussed above, despite any transformation of a voucher from one form to another that might result in semantic changes to the voucher, whether it is the same voucher can be determined using, for example, a utility like the Ruby gem called lorax referred to above, and by verifying the voucher's signature.

```
<?xml version="1.0" encoding="UTF-8"?>
<XRD xmlns="http://docs.oasis-open.org/ns/xri/xrd-1.0"
xmlns:xsi="http://www.w3.org/2001/XMLSchema-instance" xmlns:AV="http://def.av.net/ns/AV-1.1"
xml:id="f56dc570-8599-012e-1456-40400eea210e">
    <Property type="http://def.av.net/types/ActiveVoucher/1.1" xsi:nil="true"></Property>
```

```
    <Subject>http://roipdev-1.dev:3000/cMS-Test1/Winter-Scene-Pass/f56dc570-8599-012e-1456-
40400eea210e</Subject>
    <Link rel="http://def.av.net/types/ActiveRight/1.0"
href="http://uwd.locateinc.com:3005/asset/06fbae50-8733-012d-bc57-40400eea210e">
        <Title xml:lang="en">Winter Scene Right</Title>
        <Property type="http://def.av.net/types/ActiveRight/1.0/createdAt">2011-06-30 22:55:22
    UTC</Property>
        <Property type="http://def.av.net/types/ActiveRight/1.0/updatedAt">2011-06-30 22:55:22
    UTC</Property>
        <Property type="http://def.av.net/types/ActiveRight/1.0/httpMethod"></Property>
        <Property type="http://def.av.net/types/ActiveRight/1.0/parameters"></Property>
        <Property type="http://def.av.net/types/ActiveRight/1.0/paramTemplateUrl"></Property>
        <Property type="http://def.av.net/types/ActiveRight/1.0/iconUrl"></Property>
        <Property type="http://def.av.net/types/ActiveRight/1.0/return"></Property>
        <Property type="http://def.av.net/types/ActiveRight/1.0/description">Beautiful Winter
    Scene</Property>
    </Link>
    <AV:Name>Winter Scene Photo</AV:Name>
    <AV:Description>Winter Scene Photo</AV: Description>
    <AV:Category>PRODUCT</AV:Category>
    <AV:AssetType>Still Images</AV:AssetType>
    <AV:CreatedAt>2011-06-30 22:55:22 UTC</AV:CreatedAt>
    <AV:UpdatedAt>2011-06-30 22:55:22 UTC</AV:UpdatedAt>
    <AV:Uuid>f56dc570-8599-012e-1456-40400eea210e</AV:Uuid>
    <AV:Signature>MC4CFQCN1NZr1oG9q-
V3LpxGtMTpFZw63AIVAIXqXOIWJfVMGsqFt2StfAGqP6Wb</AV:Signature>
    <AV:Metadata></AV:Metadata>
    <AV:IssueEndpoint>http://roipdev-1.dev:3000/cMS-Test1/Winter-Scene-Pass</AV:IssueEndpoint>
    <AV:AuthEndpoint>http://roipdev-1.dev:3001/roip/token</AV:AuthEndpoint>
    <AV:Refresh></AV:Refresh>
    <AV:UserIdentity>http://david.m.watson.myopenid.com/</AV:UserIdentity>
    <AV:MoneyAmount></AV:MoneyAmount>
    <AV:MoneyDenomination></AV:MoneyDenomination>
    <AV:IssuerIdentity></AV:IssuerIdentity>
    <AV:ValidTo></AV:ValidTo>
    <AV:Type>PASS</AV:Type>
</XRD>
```

According to a specific implementation, RoIP vouchers as seen by their users conform to the XRD (Extensible Resource Descriptor, http://docs.oasis-open.org/xri/xrd/v1.0/xrd-1.0.html) document format, which is defined as an XML Schema. The AV namespace used to extend XRD for the RoIP system offers several variable parameters used to describe and control the behavior of the voucher. XML voucher templates with slots for filling in some of these variables are used to create new vouchers and offer vouchers. The ordering of the elements in the AV namespace, and of child elements of the <Link> element, is not determinative; they can appear in any order.

The RoIP design uses XRD for the following reasons:

Easy, standard-defined extensibility

Close mapping to the semantics and requirements of the RoIP system

Elements that describe themselves using URLs (which can optionally define each element in more depth)

Well-defined method for repeating groups of elements

In this implementation, vouchers do not utilize XRD's optional <ds:signature> element, because they are signed using a different canonicalization scheme.

Voucher Elements

The globally unique ID of the voucher is found in the <AV:Uuid> element. Appearances of the same value elsewhere in the Voucher are not definitive. Vouchers, once issued, are generally immutable. The <AV:Signature> element verifies the validity of the voucher's contents and prevents vouchers from remaining valid after being altered. Vouchers which are textually different, but which share the same <AV:Uuid>, are copies of the same voucher. It is an error for such copies to contain semantic differences (as opposed to differences in whitespace, line wrapping, or element ordering), and such copies will always fail validation unless the <AV:Signature> elements are also different. The <AV:Refresh> and timestamp elements are the only elements excepted from the prohibition against alteration.

All vouchers can carry the <AV:Refresh> element, but its value is crucial for ticket and permit vouchers as follows. Only one specific refresh value is acceptable by the Authorization Server (cAS) for redemption of the voucher; thus, all other refresh values are invalid and will result in redemption failure. Upon each successful redemption of a ticket or permit voucher, the refresh value in the voucher must be updated to the new one provided in the RoIP access token provided by the cAS during redemption, to retain the voucher's future usability. Because the refresh element is not part of the signed portion of the voucher, this change to the voucher will not disturb the validity of the <AV:Signature> element.

Each voucher contains zero or more rights. A right defines a capability to which the voucher gives access. The right can provide access to a concert; authorize the pickup of an appliance at a store; allow a video to be viewed, or a song or photo to be downloaded; express a title to a vehicle or a piece of real estate; authorize the creation of new vouchers or offers—authorize nearly any activity or access that is sold, traded, monitored, or registered.

Each right occupies a <Link> attribute of the voucher document, described by the <Title> of the link and defined by the URL in the links href. In XRD, a <Link> is a resource related in some way to the overall document, and the link itself describes the nature of the relationship. There is currently no defined limit to the number of rights in a voucher. The meaning of each <Property> element contained in a link is described by a type parameter with a URL that optionally can respond with detailed description but generally conforms to the last component of the URL, e.g., the property http://def.av.net/types/ActiveRight/1.0/createdAt contains the timestamp of that right's initial creation. If a right contains <Parameters>, these will be sent verbatim along with the redemption query. The ParamTemplateURL is the endpoint where a string containing additional parameters to be sent with the final redemption request for the right may be found. If it includes variables in the form of mustaches, they may be filled in according to the desires of the redeemer. If a right contains an IconUrl, it is considered a "primary" right, displayed in UIs with that icon. Non-primary rights will have their capabilities listed as text only in a UI.

- <AV:Name>—The name of the Voucher; a brief descriptive name sometimes used for display in Voucher summary lists
- <AV:Description>—A full description of the Voucher: its intended purpose; the overall implications of the combination of Rights it contains; etc.
- <AV:Category>—One of a limited number of keywords describing the scope of a Voucher's possible use. Examples: MASTER, ACCOUNT, NAMESPACE, ISSUE, OWNER, PROPOSER, PRODUCT, CURRENCY. A Master Voucher is defined as a Voucher of Type PERMIT with a Right to the issue_voucher cMS endpoint, or issue_offer cES endpoint with no account limitation. An Account Voucher is defined as a Voucher of Type PERMIT or TICKET with a Right to the issue_voucher cMS endpoint, or issue_offer cES endpoint, limited by the inclusion of the account in the endpoint to operating entirely under that single account.
- <AV:CreatedAt> and <AV:UpdatedAt>—Timestamps for when the Voucher was created and last modified by the RoIP system
- <AV:Uuid>—The globally unique ID number of the Voucher
- <AV:Signature>—The string used to verify the validity of the Voucher's contents and assure it was not improperly modified since creation
- <AV:Metadata>—Information about the Voucher, intended for automated interpretation
- <AV:IssueEndpoint>—The URL associated with the authority or Issue Voucher responsible for issuing the present Voucher
- <AV:AuthEndpoint>—The URL capable of authenticating Rights in this Voucher and issuing an Access Token for redemption of any Right within the Voucher
- <AV:Refresh>—For TICKET and PERMIT vouchers, the value that identifies the Voucher's validity for redemption. This value changes every time a Right in the Voucher is redeemed for an Access Token, so PERMITs and TICKETs can only be used by one holder.
- <AV:UserIdentity>—The email address or OpenID URL of the Voucher's holder. For PERMITs, the specified user must provide authentication credentials to effect a successful redemption for an Access Token.
- <AV:MoneyAmount>—For CURRENCY category Vouchers, the quantity of currency denomination units of value this Voucher represents
- <AV:MoneyDenomination>—For CURRENCY category Vouchers, the denomination of currency (a fixed quantity of single units) this Voucher represents. The value of single currency units is the MoneyAmount times MoneyDenomination. For example, a Voucher of MoneyAmount 7, Denomination 10, and Class of USD is worth 70 USD.
- <AV:IssuerIdentity>—If present, the user_identity of the initiator of the Voucher's issuance
- <AV:AssetType>—The general form of value, or the type of tangible asset underlying this Voucher, e.g., Still Images, Video Files, Physical Goods, Services, etc. or for CURRENCY category vouchers, the abbreviation for unit of currency, e.g., AV Cash (AVC), US Dollars (USD), Euros, etc. Also, Vouchers required for managing or using the RoIP system itself (such as a category of ISSUE or OFFER) have an AssetType of "RoIP Rights".

It will be understood by those of skill in the art that the XML representation of each field described has an equivalent in implementations in which vouchers are represented in JSON format.

HTTP Methods/Verbs and Component Operations

The following is a description of the HTTP methods or verbs used by each of the system components and the operations for which each is used according to a specific implementation.

cMS: The cMS operates on Voucher Classes within account hierarchies. When a new sub-account node is created by a holder of its parent node, an Account Voucher for the child is issued. When a resource is created by an Account Voucher holder, an Issue Voucher and associated cMS Endpoint are created. Redeeming the Issue Voucher results in the creation of a Voucher. Classes (Templates) are immutable.

- GET: Retrieves a template for a named resource (class), or Issue Voucher Template (as an account voucher's param_template GET, supplied with account=and classname=mustaches to determine which operation to perform) in the absence of a named resource (last component doesn't match any existing resources). If classname=is filled in, then the provided Issue Voucher template variables need to be filled in also. Unprotected query.
- POST: Issues a Voucher. Requires parameters to fill in all mustaches in the associated template. Returns the Voucher. POST Right implies GET Right also (for param_template_url)
- PUT: With "account=" parameter included: Creates account/subaccount named relative to the account given in the query. The requested new account can contain multiple levels separated by slashes. Returns an account voucher with PUT right to the account on the cMS. With "classname=" and issue template parameters: Creates a class, returns an Issue Voucher.
- DELETE: Deletes a class or account cES: The cES operates on Offers within account hierarchies. It builds offer and proposer Vouchers, but relies on cMS-generated Account Vouchers with cES Rights to generate tokens for access to the necessary Endpoints—the cES will not build Account, Issue or Product Vouchers.

- GET: Provides offer info, or an offer template with "account=" and "offer=" parameters in the absence of a named resource. If "offer=" is filled in, the provided offer template variables need to be filled in also. If "account=" is filled in, the PUT will create a new subaccount.
- POST: Accepts an offer. Requires Considerations specified in the offer.
- PUT: With "account=" parameter: creates account/subaccount; returns an "Offer Account" voucher with a PUT right to that subaccount, for issuing Offers. With "offer=" and mustache parameters (from the invariant Offer Template) included: issues the named Offer under the account of the query; returns an Offer Voucher. With "offer=" and "operation={{operation}}" parameter, performs the given operation on the Offer: cancel, uncancel, or collect.

DELETE: Referring to an offer: Removes that offer and its associated Endpoint. Referring to a subaccount: Removes all Endpoints under that subaccount.

cLS: The cLS operates on Vouchers within user identities.

GET: Provides a summary of all Vouchers held within a given user's folders. If no known user is present, provides a template for voucher operations in the cLS.

PUT: With "user_identity=" parameter, creates a Voucher with Rights to GET, POST and DELETE on behalf of that user.

POST: With "voucher=" and "user_identity=" parameters, places the given Voucher in a user's INBOX folder.

DELETE: With "uuid=" parameter, deletes all copies of the given Voucher from all folders belonging to the requesting user_identity.

cAS: The cAS operates on Namespaces within account hierarchies.

GET: Provides namespace info when a registered namespace name is given, otherwise returns the (fixed) namespace template.

POST: N/A

PUT: With "account=" parameter, creates a new account/subaccount; returns a Register Namespace voucher with PUT and DEL rights to that subaccount, for registering namespaces or new accounts, and DEL right to the subaccount for removing all that subaccount's namespaces. With "namespace=" parameter, registers a namespace under the account of the query.

DELETE: Referring to an existing namespace under an account: removes registration for that namespace. Referring to a (sub)account: Removes all namespaces under that (sub)account.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

Glossary

This Glossary defines many of the terms used in the foregoing description as they pertain to a particular class of embodiments and therefore forms part of this disclosure. It should be noted that embodiments are contemplated in which some of the details presented in this Glossary are modified or excluded. It should also be noted that terms defined in this Glossary are bold-faced when they first appear within a definition of another term.

Acceptance: A trade arbitrated by the Escrow Server; the process of accepting (executing) an Offer. The person (Identity) making the Offer is the Proposer; the person accepting the offer is the Acceptor. Typically, an Offer requires zero or more Vouchers (called Considerations) as input to complete, and provides one or more Vouchers (called Benefits) upon successful acceptance. Acceptances are processed by the Escrow Server Component. To accept an Offer, an Acceptor must Hold a valid Offer Voucher for an open (un-cancelled) Offer and Considerations sufficient for Acceptance. Considerations and Benefits may include any valid Voucher.

Acceptor: The person or organization accepting an Offer. The transaction or act of accepting the Offer is an Acceptance.

Account: A string, recognized by each Component, restricting the scope of an operation. Accounts may contain slashes that separate levels of a hierarchy much like a hierarchy of folders in file storage, so the Account "animal/mammal/whale" may be said to be "under", or subordinate to, or a "sub-account" of "animal/mammal". Account Vouchers are a type of Voucher used to restrict the issuance of Vouchers (including Offers), or the Redemption of other Resources, to the Account associated with the Account Voucher; for example, an Account Voucher for the "animal" Account couldn't be used on the cMS to create a Voucher class of "vegetable/carrot" but would be effective, if desired, to create a Voucher Class of "animal/human". Account Vouchers typically contain Rights to create new Classes, Offers, Namespaces, or new Account Vouchers for subaccounts.

Authorization Server (cAS): The Component responsible for validating Vouchers for Redemption; issuing Tokens and Refreshes; managing the registration of Namespaces; validating Rights for Redemption against registered Namespaces; and managing the collection of Credentials to validate user Identities against those asserted in Permits to be Redeemed. No Redemption of any Voucher may occur without the Authorization Server first checking its validity and issuing a Token as confirmation.

Benefit: One or more Vouchers supplied to the Accepter of an Offer upon payment of any and all Considerations required by the Offer, and upon successful completion of the Acceptance.

Benefit Issue Voucher (BIV): An Issue Voucher giving the Holder the Capability to issue a single Voucher (a Benefit) to be supplied to the Acceptor of a successfully accepted Offer. The Escrow Server Component Redeems each BIV associated with an Offer at the time of each Acceptance of that Offer. Therefore, one BIV might eventually result in the issuance of many Benefit Vouchers, and an Offer can contain zero or more BIVs. (Most Offers contain one or more BIVs.)

Bootstrap Voucher (BSV): A Voucher used by a client of a LockBox (cLS) to obtain access to that user's Repository of Vouchers. This elminates the chicken-and-egg proposition inherent in protecting Repositories using RoIP, when a user's Voucher(s) for Repository access are held in that Repository.

Cancellation: The process of disabling an Open Offer for a period of time, possibly permanently. A Proposer receives a Voucher (called a "Proposer Voucher") upon Offer Issuance, containing Rights for Cancellation, Uncancellation, and Collection of that specific Offer. The Proposer Redeems the Cancellation Right to request an Escrow Server to cancel an Offer until the Offer is uncancelled.

Capability: An ability granted by a Right within a Voucher. For example, a Voucher for a song might include multiple Rights granting capabilities to download and/or to stream that song to the Holder's browser or device.

Claim: To acquire the ability to Redeem a Ticket; to become the Holder of a Ticket or Permit by updating one's copy of that Voucher to reflect its unique, current Refresh. Claiming is useful, for example, if a Voucher Holder suspects that someone else may have an exact copy of of a Voucher. Claiming will invalidate all other copies of a Ticket or Permit. Anyone possessing a Valid Ticket or Permit Voucher can Claim it, as opposed to Redeeming a Permit, for which the Holder must supply correct authentication credentials valid to authenticate the Identity specified in the Permit. Only one person at a time can Hold a Ticket or Permit; even the person or organization identified in the Voucher's Identity cannot Redeem that Voucher if they are not the Voucher's current Holder. The Claim process is performed by the Authorization Server Component by updating the current Refresh of the Ticket or Permit to a new value, and sending the new Refresh to the person (or Component) requesting the Claim. It is the Claimer's responsibility to update their copy of the Voucher with the new Refresh as received from the Authorization Server.

Class: The grouping defined by all the characteristics held in common between all Vouchers to be issued by a single Issue Voucher, and whose Voucher Templates are identical—even if they contain Mustache variables whose values will vary in the various final Vouchers to be issued by requests to the Mint Server Endpoint associated with that Issue Voucher. Vouchers issued from the same Endpoint on the Mint Server, by definition, belong to the same Class. Classes are named by their requestors using Rights contained in Account Vouchers, combined with a parameter specifying the Class name.

Collection: The act or process of a Proposer's Redemption of the Collection Right within a Proposer Voucher to request and receive all the Consideration Vouchers that were received from Acceptors of a given Offer, and stored on behalf of the Proposer by the Escrow Server Component at the time of each Acceptance of that specific Offer.

Component: A web-accessible server process responsible for handling a defined list of RoIP requests and executing RoIP transactions, often in collaboration with other Components communicating among a loosely-coupled group via HTTP/SSL with REST semantics. The system's architecture permits a single Component to run on multiple load-balanced servers or virtual hosts, so a Component is formally defined as a set of REST-based web services, conforming to the RoIP APIs, at a particular IP address and port. There may be multiple instances of each Component; also, there may be multiple "clusters" of mutually interoperating Components. Each Component instance is one of: Authorization Server (cAS); Escrow Server (cES); Lockbox Server (cLS); Mint Server (cMS); Protected Resource Server (cPR).

Consideration: The Voucher(s) provided by an Acceptor in order to satisfy the Proposer's requirements contained in an Offer. During Acceptance, the Escrow Server validates each Consideration presented as part of the Offer Acceptance request by checking the Issue Endpoint attribute of the presented Consideration Voucher against the Issue Endpoint specified for that Consideration in the Offer. Only Vouchers matching that unique Issue Endpoint are acceptable to satisfy that Consideration of the Offer. Offers may contain zero or more required Considerations.

Credentials: The string of text (password, passphrase, etc.) associated with a person or organization's Identity and given to log into a Component or validate an Identity for purposes of Permit Redemption. The RoIP system does not store Credentials; it outsources their collection to external services via OpenID or other well-known open protocols.

Currency: Vouchers that carry value either as money issued by a central bank or Ministry of Finance, or as "loyalty points", "frequent flyer miles", or other units acceptable within a commercial context and rules for paying for certain goods and services. Vouchers encode the type of currency (e.g., "US Dollar", "Euro", or "Proctor & Gamble Loyalty Coupon"), the denomination of the currency (the size of the "bill", for example 20) and the numeric quantity of that denomination. The value of a Voucher is the denomination times the amount. Offers can require a particular total currency value as Considerations.

Endpoint: In general, an Endpoint is defined as any unique URL at which a web-based service or resource may be requested. In the RoIP system, the Escrow Server and Mint Server maintain databases defining the Endpoints available on that local component for specific Offer operations (on the Escrow Server) and Voucher Issuance operations (on the Mint Server). These stored Endpoint data items contain any information required to execute the requested transaction. In the case of the Mint Server, each Endpoint is associated with an Issue Voucher, and contains the Voucher Template for the final Voucher to be issued.

Escrow Server (cES): The Component responsible for issuing Offers and executing all Offer Acceptances and other Offer-related transactions. The cES exposes an Endpoint which the Holder of a Voucher with the associated Issue Offer Right may access to issue a new Offer. Upon Issuance, that Voucher Holder (Proposer) receives an Offer Voucher, and an associated Proposer Voucher including Rights granting the Capabilities to Cancel, Uncancel, and Collect the specific Offer.

Hold: To possess a Pass Voucher, or to possess a Ticket or Permit Voucher containing the unique most recent Refresh value issued by the Authorization Server, which confers the Capability to Redeem any Right within the Voucher. (For Permits, the credentials for the Voucher's Identity will also be collected by the Authorization Server before Redemption is possible).

Holder: An Identity that Holds a Voucher.

Identity: A person or organization possessing the Credentials to validate a string (also sometimes called an Identity)—often a simple email address—which is used as an account login on Components, and in the user_identity field of a Voucher to identify to whom it was issued. The user_identity is not necessarily the current Holder of the Voucher, but if the Voucher is a Permit, it is not redeemable unless the Holder can provide the Credentials associated with the Voucher's user_identity. Generally, this implies that the Holder is almost always the same Identity as the Redeemer.

Issuance: The action or process of issuing (minting) a new Voucher or Offer. The process is initiated by a request to the Mint Server in the case of Vouchers, and by a request to the Escrow Server in the case of Offers. To issue a Voucher, the Issuer Redeems an Issue Voucher with a request to the Mint Server, which retrieves (from the Endpoint associated with the Issue Voucher) the Voucher Template for the Voucher to be issued. The Issuer is presented with the Voucher Template for that specific Class of Voucher, including text fields to be filled in wherever Mustache variables are available to customize the final Voucher to be issued. To issue an Offer, the Issuer redeems an Account Voucher containing an Offer Issue Right with the Escrow Server, which presents a fixed Offer Template for the Issuer to customize Issue Voucher: A Voucher containing a Right to an Endpoint on the Mint Server, used to issue a particular Class of Voucher.

Issuer: The Identity who issues a new Voucher, and who appears in the issuer_identity field of the issued Voucher.

Lockbox: Any service used for managing a collection of Vouchers (Repository) on behalf of one or more users. A Lockbox could manage Vouchers stored in an email account, a USB thumb drive, a CF or SD memory card, or any database capable of managing key/value data stores.

Lockbox Server (cLS): A Component responsible for maintaining a repository or "wallet" of Vouchers on behalf of users having Lockbox Server, and providing a user interface for users to execute RoIP transactions such as Issuance and perform maintenance operations such as tagging, organizing, and deleting Vouchers in their Repository (regardless of whether the user happens to be either the Holder and/or listed in the user_identity field of the Voucher in their Repository).

Mint Server (cMS): The Component responsible for responding to Voucher Issuance requests—where the actual Issuance takes place. During Issuance, the Mint Server requests and receives from the Authorization Server an initial Refresh value to assign to the new Voucher.

Mustache: A variable text field within a Voucher Template, Offer Template, or associated with a Protected Resource, that is used to customize parameters for the Redemption Request. These fields are known as Mustaches because they are identified by a double pair of curly braces surrounding the variable name, that look a little like an actual mustache. A user interface might present a Mustache as a text field available for filling in however an Issuer or Redeemer deems appropriate for the specific request being made.

Namespace: A text string naming the top of a DNS sub-tree (e.g. "musiclabel.com") and protecting all domains "under" or subordinate to it (e.g., "songs.musiclabel.com"). Namespaces are registered with an Authorization Server by associating an Account with a Namespace, and the Authorization Server reserves each Namespace to the first Account to register it, preventing any other Account (except Accounts "above" the requesting account) from issuing Vouchers or redeeming Vouchers for Tokens with Rights under that Namespace. In this way, the owners of Protected Resources (including Resources on RoIP Components) can assure that malicious or unknown Issuers cannot create valid Vouchers containing Rights to the Resource owner's Resources. Protected Resource Servers are assured that those who issue Vouchers with Rights to its Resources are authorized to do so while the Protected Resource Server still sees only Tokens, never Vouchers.

Offer: An opportunity offered by a Proposer to exchange zero or more Vouchers of a certain Class (and/or Vouchers of a given Currency value) provided as Considerations by an Acceptor, for one or more different Vouchers provided by the Proposer as Benefits, in a transaction mediated and brokered by an Escrow Server. The flexible nature of Vouchers and Rights enables RoIP Offers to express almost any kind of potential business or financial transaction. The Offer is encoded into an Offer Voucher and made available at an Escrow Server Endpoint for Acceptance, Cancellation, Uncancellation, and Collection to Holders of Vouchers containing valid Rights to each operation.

Offer Template: The Param Template stored by an Escrow Server and presented to a potential Proposer at Offer Issuance to customize into a specific Offer by filling in included Mustaches.

Offer Voucher: A Voucher containing an Acceptance Right to a specific Offer. This Voucher is generated by the Escrow Server and provided to the Proposer upon successful Offer Issuance, then generally published, or given or sold by the Proposer to potential Acceptors.

Param Template: A string, optionally containing one or more Mustaches, specifying certain characteristics of the contents of an Offer or Voucher to be issued, or options to provide to a Protected Resource Server. Param Templates with their Mustaches interpolated into actual values are provided to Mint Server during Voucher Issuance, to the Escrow Server during Offer Issuance, and to a Protected Resource Server during Redemption of a Right in a Voucher. The Param Template is served to a client Component or application as the response to a preliminary request made to the URL of the param_template_url field of a Right prior to its Redemption, giving the client the ability to fill in any Mustaches as appropriate for the specific request being made, in a step prior to the Redemption itself.

Pass: a Voucher that may be freely copied and whose Rights may be Redeemed by anyone possessing a valid copy.

Permit: a Voucher whose Rights may only be Redeemed by a Holder who possesses the unique Credentials associated with the Identity given in the user_identity field of the Voucher. Comparable to an airline ticket, good only for the person named.

Proposal: The process, performed by a Proposer, of creating and Issuing an Offer.

Proposer: The Identity who issues an Offer. This Identity receives an Offer Voucher and a Proposer Voucher upon successful Offer Issuance.

Proposer Voucher: A Voucher issued by the Escrow Server and provided to the Proposer of each Offer, containing Rights to Cancellation, Uncancellation, and Collection of that specific Offer. Usually a Permit.

Protected Resource: Any object, digital media asset, text, service, or action provided by a web server upon a request to a specific URL and authorized by an accompanying valid RoIP Token. Any server with the ability to check the validity of a Token to permit or refuse requests is, by definition, a Protected Resource Server. Definition and enforcement of the rules governing the interpretation of Token contents to establish validity and thus grant or deny access are provided as defaults by the RoIP system, but ultimately they are the responsibility of the specific Protected Resource Server.

Protected Resource Server (cPR): A web server with the ability to authorize or refuse specific requests according to the validity of accompanying Tokens. Protected Resource Servers never see Vouchers, only a Token embedded in the HTTP header of each request.

Redemption: The process or action of making a query to the endpoint_uri of a Right in order to access a Protected Resource. The steps in a Redemption are: 1) Request and receive a Token from the Authorization Server associated with the Voucher containing the relevant Right (in the case of Permits, a Credential collection step is included in this Token provision step); 2) Provide this Token in a query to the endpoint_uri of the Right, which is by definition the URL of the Protected Resource.

Redeemer: The Identity who initiates a Redemption.

Refresh: A cryptographically strong (infeasible to guess), pseudorandom string stored and associated by an Authorization Server with a Ticket or Permit, and provided to a Mint Server or Escrow Server on initial Voucher Issuance for inclusion in the new Voucher. Also the Refresh is updated (and a completely new string chosen) upon every request to the Authorization Server for 1) satisfying a Claim for the Voucher; or 2) providing a Redeemer with a Token permitting Redemption of any Right within the Voucher. This new Refresh is provided only to the Redeemer or Claimer, making them the Holder of the Permit or Ticket until such time as any further Claim is received. The Holder is responsible for updating the Voucher with the received Refresh, without which the Voucher's Rights will not be capable of Redemption at all. This is how the RoIP system enforces a sole unique Holder for every Ticket or Permit at any given time.

Repository: A collection of Vouchers held by a specific identity.

Resource: a URL representing a good or service of value. The RoIP system secures access to these URLs based on Vouchers held by potential accessors (Redeemers).

Right: A characteristic group of key/value pairs present in quantities of zero or more within each Voucher, each Right containing the URL of a Protected Resource. Rights may be Redeemed by the valid Holder of a Voucher, and may also contain related information including a URL at which the Right's Param Template may be obtained.

RoIP: Rights over Internet Protocol, a distributed system for encoding, conveying, sharing, trading, and securing restricted access to any good or service of value via the Internet.

Scope: The URL defining one or more protected Resources to which access is granted by a Token generated by the Authorization Server based on presentation of a valid Voucher. The Scope is a field within each Token.

Ticket: A Voucher which can only be Redeemed by one Holder, but for which the Holder's Identity is unrestricted. Comparable to a theater ticket, usable by any one person.

Token: a cryptographically signed, JSON-encoded array of variable names and values whose format is based on OAuth 2.0 Access Tokens, issued by an Authorization Server and associated with a Right. The Token is embedded within the HTTP header of a web query. Protected Resource Servers require a Token to be provided with every request for a Protected Resource, and authorize or deny the request based on the Token's validity. Tokens have a limited lifespan (typically ten minutes) before their validity expires.

Uncancellation: The process or action of re-enabling Acceptance of a specific Offer that was previously Cancelled. The Offer's Proposer holds a Proposer Voucher containing a Right for the Uncancellation of the Offer, which is redeemed to request the Offers's Uncancellation.

Valid: A Voucher that is well-formed and whose cryptographic signature matches the signed part of its content is Valid. Or, a Token that is well-formed; whose cryptographic signature matches its content; whose Scope matches the request for a RoIP-protected Resource; and which has not yet expired is Valid.

Voucher: A digitally encoded bearer instrument, the foundation of the Rights over Internet Protocol (RoIP) system, which encodes monetary or commercial value and/or zero or more mutually-related Rights, conferring the ability to access goods or services. A Voucher is issued by a RoIP Component, and can be expressed as an unordered list of key/value pairs; stored in a database; or transferred via email, and can have associated descriptive HTML and various other descriptive and controlling attributes. Every Voucher is either a Pass, Permit, or Ticket. Vouchers are signed and contain a signature string used by the Authorization Server as a step in validation.

Viewer: The user interface of a Lockbox. Sometimes implemented within an HTML iframe associated with a RoIP-capable application.

Voucher Template: A string of text that provides a basis for issuing a Voucher and defines a Voucher Class. As a special case of a Param Template, a Voucher Template may include embedded Mustaches. The Voucher Template associated with a Voucher Class (and Mint Server Endpoint) is normally displayed, with editable text fields showing Mustaches, by the user interface of any system such as a Lockbox Server that facilitates Voucher Issuance, but Issuance does not necessarily require the use of a Voucher Template, if the parameters accompanying an Issuance request to a Mint Server are sufficient to define the Voucher to be issued, for example in the case of automated Issuance.

What is claimed is:

1. A computer-implemented method, comprising:
receiving, from a wallet component of a distributed system, a request for a transaction relating to a protected resource, the request including a rights object stored in the wallet component, the rights object representing a right to engage in the transaction and corresponding to a list of key/value pairs stored by one or more servers of the distributed system;
validating the rights object based on matching a most current value of the rights object to a corresponding value of the list of key/value pairs stored by the one or more servers of the distributed system;
providing a transaction object to facilitate the transaction based on validation of the rights object; and
updating the most current value of the rights object and the list of key/value pairs stored by the one or more servers to reflect the transaction.

2. The method of claim 1, wherein the transaction object includes a digital signature, the method further comprising facilitating the transaction based on the digital signature matching a public key of a source of the transaction object in the distributed system.

3. The method of claim 1, wherein the most recent value of the rights object is included in a digital signature that is included in the rights object.

4. The method of claim 1, wherein the wallet component is associated with a user identity, and wherein the user identity is not associated with the protected resource.

5. The method of claim 1, wherein the wallet component is associated with a user identity, wherein the rights object is one of a plurality of rights objects stored in the wallet component, each of the rights objects corresponding to a protected resource, and wherein the wallet component is configured to enable management of the rights objects using the user identity and independent of the protected resources.

6. The method of claim 1, wherein the wallet component is associated with a plurality of user identities, and wherein the wallet component is configured to enable management of the rights object using any of the user identities.

7. The method of claim 1, wherein the transaction object refers to an endpoint of the distributed system, the method further comprising transmitting the transaction object to the endpoint of the distributed system.

8. The method of claim 1, wherein the rights object represents a plurality of access rights relating to the protected resource, the method further comprising facilitating the transaction in relation to a specific access right of the plurality of access rights.

9. The method of claim 1, wherein the wallet component is associated with a user identity, the method further comprising performing an authentication of the user identity in connection with the request for the transaction before providing the transaction object.

10. The method of claim 1, wherein the wallet component is associated with a user identity, and wherein validating the rights object and providing the transaction object do not require authentication of the user identity.

11. A system, comprising memory and one or more processing resources configured to:
receive, from a wallet component of a distributed system, a request for a transaction relating to a protected resource, the request including a rights object stored in the wallet component, the rights object representing a right to engage in the transaction and corresponding to a list of key/value pairs stored by one or more servers of the distributed system;

validate the rights object based on matching a most current value of the rights object to a corresponding value of the list of key/value pairs stored by the one or more servers of the distributed system;

provide a transaction object to facilitate the transaction based on validation of the rights object; and update the most current value of the rights object and the list of key/value pairs stored by the one or more servers to reflect the transaction.

12. The system of claim 11, wherein the transaction object includes a digital signature, and wherein the one or more processing resources and memory are configured to facilitate the transaction based on the digital signature matching a public key of a source of the transaction object in the distributed system.

13. The system of claim 11, wherein the wallet component is associated with a user identity, and wherein the user identity is not associated with the protected resource.

14. The system of claim 11, wherein the wallet component is associated with a user identity, wherein the rights object is one of a plurality of rights objects stored in the wallet component, each of the rights objects corresponding to a protected resource, and wherein the wallet component is configured to enable management of the rights objects using the user identity and independent of the protected resources.

15. The system of claim 11, wherein the wallet component is associated with a plurality of user identities, and wherein the wallet component is configured to enable management of the rights object using any of the user identities.

16. The system of claim 11, wherein the transaction object refers to an endpoint of the distributed system, and wherein the one or more processing resources and memory are further configured to transmit the transaction object to the endpoint of the distributed system.

17. The system of claim 11, wherein the rights object represents a plurality of access rights relating to the protected resource, and wherein the one or more processing resources and memory are further configured to facilitate the transaction in relation to a specific access right of the plurality of access rights.

18. The system of claim 11, wherein the wallet component is associated with a user identity, and wherein the one or more processing resources and memory are further configured to perform an authentication of the user identity in connection with the request for the transaction before providing the transaction object.

19. The system of claim 11, wherein the wallet component is associated with a user identity, and wherein the one or more processing resources and memory are configured to validate the rights object and provide the transaction object without authentication of the user identity.

20. A computer program product, comprising one or more non-transitory computer-readable media having computer program instructions stored therein, the computer program instructions being configured such that, when executed by one or more computing devices, the computer program instructions cause the one or more computing devices to:

receive, from a wallet component of a distributed system, a request for a transaction relating to a protected resource, the request including a rights object stored in the wallet component, the rights object representing a right to engage in the transaction and corresponding to a list of key/value pairs stored by one or more servers of the distributed system;

validate the rights object based on matching a most current value of the rights object to a corresponding value of the list of key/value pairs stored by the one or more servers of the distributed system;

provide a transaction object to facilitate the transaction based on validation of the rights object; and update the most current value of the rights object and the list of key/value pairs stored by the one or more servers to reflect the transaction.

* * * * *